(12) United States Patent
Chang et al.

(10) Patent No.: US 11,835,182 B2
(45) Date of Patent: Dec. 5, 2023

(54) VACUUM HEAT-INSULATION DEVICE FOR LOW-TEMPERATURE TANK

(71) Applicant: LATTICE TECHNOLOGY CO., LTD., Daejeon (KR)

(72) Inventors: Daejun Chang, Daejeon (KR); Hyunjun Park, Daejeon (KR); Jungwoog Kim, Daejeon (KR)

(73) Assignee: LATTICE TECHNOLOGY CO., LTD., Daejeon (KR)

(*) Notice: Subject to any disclaimer, the term of this patent is extended or adjusted under 35 U.S.C. 154(b) by 169 days.

(21) Appl. No.: 17/593,053

(22) PCT Filed: Mar. 7, 2019

(86) PCT No.: PCT/KR2019/002667
§ 371 (c)(1),
(2) Date: Sep. 7, 2021

(87) PCT Pub. No.: WO2020/179956
PCT Pub. Date: Sep. 10, 2020

(65) Prior Publication Data
US 2022/0178496 A1 Jun. 9, 2022

(51) Int. Cl.
*F17C 3/08* (2006.01)
*F17C 3/04* (2006.01)

(52) U.S. Cl.
CPC .................. *F17C 3/08* (2013.01); *F17C 3/04* (2013.01); *F17C 2201/0157* (2013.01);
(Continued)

(58) Field of Classification Search
CPC ........ F17C 2201/0157; F17C 2203/014; F17C 2203/0619–0624; F17C 2203/0629; F17C 3/04; F17C 3/08
(Continued)

(56) References Cited

U.S. PATENT DOCUMENTS 3,302,358 A * 2/1967 Robert .................... F17C 3/027
52/406.1
3,416,693 A * 12/1968 Covington ................ F17C 3/08
220/560.13
(Continued)

FOREIGN PATENT DOCUMENTS

CA 2516379 A1 9/2004
CN 208107632 U 11/2018
(Continued)

OTHER PUBLICATIONS

ISA Korean Intellectual Property Office, International Search Report Issued in Application No. PCT/KR2019/002667, dated Dec. 5, 2019, 4 pages.
(Continued)

*Primary Examiner* — Stephen J Castellano
(74) *Attorney, Agent, or Firm* — McCoy Russell LLP

(57) ABSTRACT

The present disclosure relates to a vacuum heat-insulation device for a large low-temperature tank, the vacuum heat-insulation device having excellent heat insulation properties and vacuum stability by using a low-temperature heat-insulating material maintained in a vacuum at all times so as to store an ultra-low-temperature liquefied gas such as liquid nitrogen ($LN_2$) or liquid hydrogen ($LH_2$), and to a vacuum heat-insulation device for a low-temperature tank, the vacuum heat-insulation device having a flexible structure in which a vacuum jacket is partially contractible according to contraction of a low-temperature tank or a low-temperature heat-insulating layer.

19 Claims, 21 Drawing Sheets

(52) U.S. Cl.
 CPC ........... F17C 2203/0304 (2013.01); F17C
 2203/0391 (2013.01); F17C 2203/066
 (2013.01); F17C 2203/0629 (2013.01); F17C
 2205/0107 (2013.01); F17C 2205/0188
 (2013.01); F17C 2205/0352 (2013.01); F17C
 2221/033 (2013.01)

(58) Field of Classification Search
 USPC .................................................. 220/560.06
 See application file for complete search history.

(56) References Cited

U.S. PATENT DOCUMENTS

| | | | | |
|---|---|---|---|---|
| 4,027,379 | A | * | 6/1977 | Cheng .................. F16L 59/065 |
| | | | | 220/592.27 |
| 4,038,832 | A | * | 8/1977 | Lutgen .................. F17C 13/086 |
| | | | | 220/592.27 |
| 4,065,019 | A | * | 12/1977 | Letourneur ............. F17C 3/025 |
| | | | | 220/560.07 |
| 4,098,425 | A | * | 7/1978 | Yamamoto ............. F17C 3/025 |
| | | | | 220/651 |
| 7,743,940 | B2 | | 6/2010 | Brunnhofer |
| 8,807,382 | B1 | | 8/2014 | Haberbusch et al. |
| 2001/0019061 | A1 | | 9/2001 | Ettlinger |
| 2006/0169704 | A1 | | 8/2006 | Brunnhofer |
| 2006/0196876 | A1 | * | 9/2006 | Rohwer .................... F17C 3/04 |
| | | | | 220/560.12 |
| 2017/0254481 | A1 | | 9/2017 | Cadogan et al. |
| 2018/0224064 | A1 | | 8/2018 | Aceves et al. |

FOREIGN PATENT DOCUMENTS

| | | |
|---|---|---|
| JP | 2006057784 A | 3/2006 |
| JP | 2018128053 A | 8/2018 |
| KR | 20090116956 A | 11/2009 |
| KR | 100990179 B1 | 10/2010 |

OTHER PUBLICATIONS

European Patent Office, Extended European Search Report Issued in Application No. 19917983.9, dated Aug. 22, 2022, Germany, 7 pages.

Japanese Patent Office, Office Action Issued in Application No. 2021-547536, dated Aug. 30, 2022, 10 pages.

Korean Intellectual Property Office, Office Action Issued in Application No. 2021-7025985, dated Feb. 6, 2023, 13 pages.

* cited by examiner

VACUUM HEAT-INSULATION DEVICE FOR LOW-TEMPERATURE TANK

CROSS REFERENCE TO RELATED APPLICATIONS

The present application is a U.S. National Phase of International Application No. PCT/KR2019/002667 entitled "VACUUM HEAT-INSULATION DEVICE FOR LOW-TEMPERATURE TANK," and filed on Mar. 7, 2019. The entire contents of each of the above-listed applications are hereby incorporated by reference for all purposes.

TECHNICAL FIELD

The present disclosure relates to a device for vacuum-insulating a lower-temperature tank, and to a device capable of vacuum-insulating a lower temperature tank for storing and transporting a liquefied gas in an ultra-low-temperature state.

BACKGROUND AND SUMMARY

In general, a liquefied natural gas (LNG) refers to a colorless and transparent ultra-low-temperature liquid whose volume is reduced to 1/600 by cooling a natural gas containing methane as a main component to −162° C. As such a liquefied natural gas appears as an energy resource, in order to use such a gas as energy, an efficient transportation method that may transport the liquefied natural gas in large quantities from a production base to a receiving site of a demand site has been reviewed. As a result, a liquefied natural gas carrier for sea transportation of the liquefied natural gas has appeared.

The liquefied natural gas carrier as described above should be provided with a low-temperature tank capable of storing the liquefied natural gas liquefied in an ultra-low temperature state for storage and transportation, and in order to store the liquefied natural gas having a medium atmospheric pressure higher than atmospheric pressure and a boiling temperature of −160° C., such a low-temperature tank should be made of materials (aluminum alloy, stainless steel, 35% nickel steel, etc.) that may withstand an ultra-low-temperature, and requires a design that may cope with thermal stress and thermal contraction, and installation of an insulation structure that may prevent heat intrusion.

Here, the low-temperature tank applied to the liquefied natural gas carrier may be classified into a membrane type and a self-supporting type according to a structure thereof. The membrane type tank is made in such a way that a hull supports a pressure generated inside the tank by using a corrugated membrane sheet made of stainless steel on an inner surface of the tank in which the liquefied gas is stored to enable thermal contraction in response to thermal deformation caused by the liquefied gas and forming a heat-insulation material layer surrounding an outer surface to support the membrane sheet and a secondary barrier supported on the hull of the carrier, as disclosed in Korean Patent Laid-Open Publication No. 10-2017-0116584 (SEALED TANK WITH CORRUGATED SEALING MEMBRANES published on Oct. 19, 2017).

In this case, conventionally, in order to prevent a moisture remaining in the heat-insulation material layer from being cooled to deteriorate a performance of the heat-insulation material, the tank is filled with dry air having a dew point of −50 to −60° C., but in the case of liquefied hydrogen ($LH_2$), which is liquefied and has a boiling temperature of −250° C., oxygen and nitrogen of the dry air filled therein are liquefied and condensed near a surface of a liquefied hydrogen tank to significantly degrade the performance of the insulation, thereby causing problems that a performance failure of the entire heat-insulation layer is caused, and long-term reliability of stability of the tank is questionable.

DISCLOSURE

Technical Problem

An object of the present disclosure is to provide a vacuum heat-insulation device for a large low-temperature tank having high thermal insulation and vacuum stability by using a heat-insulation material maintained in a vacuum at all times so as to store an ultra-low-temperature liquefied gas such as liquid nitrogen ($LN_2$) or liquid hydrogen ($LH_2$).

Technical Solution

According to a vacuum heat-insulation device for a low-temperature tank of the present disclosure, it is possible to provide a vacuum heat-insulation device for a low-temperature tank capable of storing an ultra-low-temperature fluid such as liquid hydrogen ($LH_2$) or liquid nitrogen ($LN_2$) by maintaining a low-temperature heat-insulation layer in a vacuum state.

Further, it is possible to provide a vacuum heat-insulation device for a low-temperature tank that supports a pressure of the ultra-low-temperature fluid stored therein by the low-temperature tank itself, and may cope with a thermal contraction of the low-temperature tank by a temperature of the ultra-low-temperature fluid by configuring a portion of a vacuum jacket to have a flexible structure that may be contracted according to the contraction of the low-temperature tank or the low-temperature heat-insulation layer.

Advantageous Effects

According to the present disclosure having the above-mentioned configurations, it is possible to provide the vacuum jacket that may maintain the low-temperature heat-insulation layer surrounding the outer shell of the low-temperature tank in the vacuum state at all times to maintain higher insulation efficiency, thereby securing long-term reliability, and may support a pressure of the ultra-low-temperature fluid stored therein by the low-temperature tank itself and may cope with the thermal contraction of the low-temperature tank by the temperature of the ultra-low-temperature fluid by a portion of the vacuum jacket having a flexible structure that may be contracted according to the contraction of the low-temperature tank or the low-temperature heat-insulation layer, thereby manufacturing the large tank having long-term high reliability.

DETAILED DESCRIPTION

Best Mode

Figure 1:
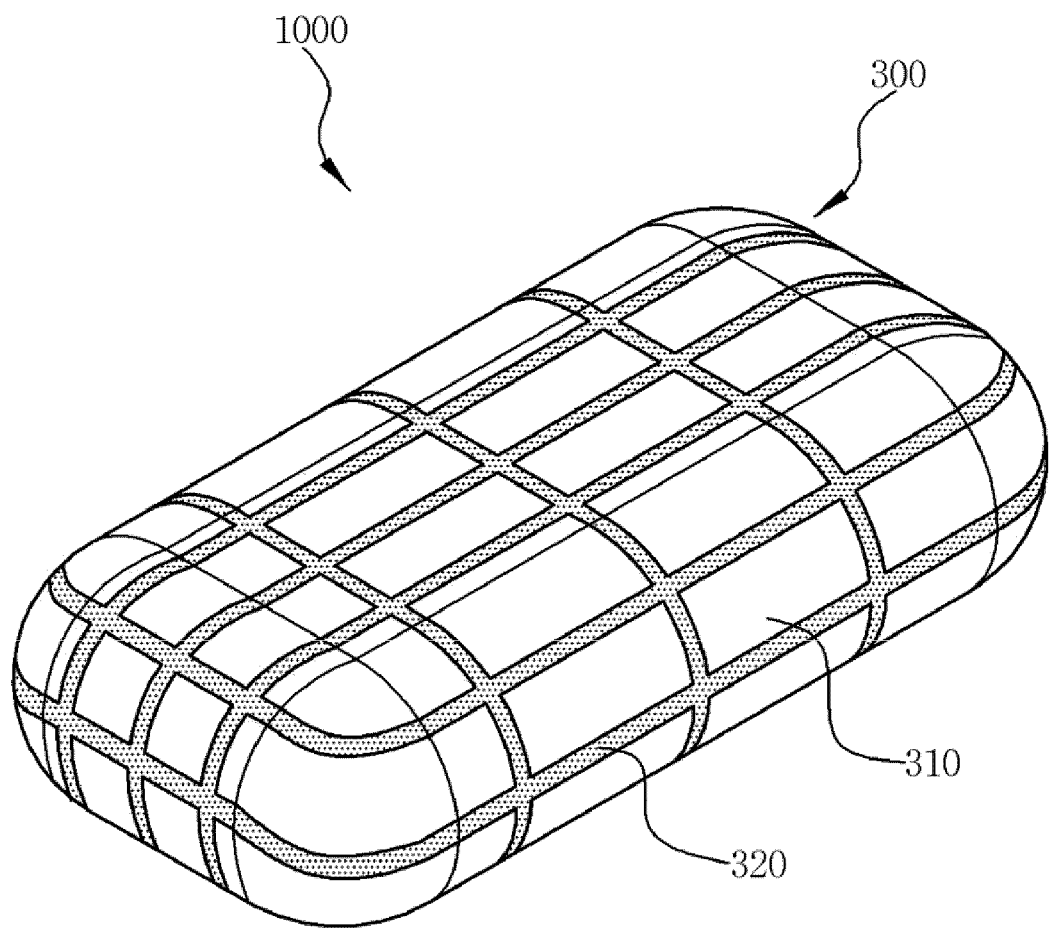
FIG. 1 is a perspective view illustrating a vacuum heat-insulation device according to an embodiment of the present disclosure.

In one general aspect, a vacuum heat-insulation device for a low-temperature tank includes: a low-temperature tank having a storage space for accommodating an ultra-low-temperature fluid therein; a low-temperature heat-insulation layer provided to surround an outer shell of the low-temperature tank; and a vacuum jacket having an internal space maintained in a vacuum state and sealed to surround an outer surface of the low-temperature heat-insulation layer to maintain airtightness with the outside, wherein the vacuum jacket has a flexible structure in which at least a portion thereof is contracted or expanded.

The vacuum jacket may include a plurality of smooth portions surrounding the outer surface of the low-temperature heat-insulation layer and made of flat plates spaced apart from each other by a predetermined distance, and a deformable joint portion formed between the plurality of smooth portions and having the flexible structure.

The deformable joint portion may connect the plurality of smooth portions, and may be formed of a polymer elastic body that is stretchable in response to a deformation of the internal space of the vacuum jacket.

The polymer elastic body may be interposed between the plurality of smooth portions and may be bonded to outer side ends of the plurality of smooth portions in a width direction thereof.

The plurality of smooth portions may be provided to overlap with at least one adjacent smooth portion in a thickness direction, and respond to the contraction or expansion of the internal space while being slid when the internal space is deformed, and the polymer elastic body may be provided on upper surfaces of portions overlapped with the plurality of smooth portions to maintain the airtightness of the vacuum jacket and may be contracted or expanded in response to the deformation of the smooth portions.

The low-temperature heat-insulation layer may be provided in plural, and the plurality of low-temperature heat-insulation layers may be provided to be spaced apart from each other to form an internal discharge space forming a flow path for forming a vacuum between the plurality of low-temperature heat-insulation layers that are adjacent to each other.

The plurality of low-temperature heat-insulation layers may be provided to form a multiple layer in the thickness direction, and may be fixed to at least one of the outer shell of the low-temperature tank, the vacuum jacket, or the adjacent low-temperature heat-insulation layer using a fixing bolt to be spaced apart from each other by a predetermined distance.

The vacuum heat-insulation device may further include a discharge pipe provided in the internal discharge space and having a suction hole that is formed on an outer circumferential surface and communicates with the internal space of the vacuum jacket.

The deformable joint portion may be integrally formed with the plurality of smooth portions, and form a concave-convex portion curved outwardly in the thickness direction, and the concave-convex portion may be deformed according to the contraction or expansion of the internal space of the vacuum jacket.

The deformable joint portion may be configured to form an internal discharge space forming a flow path for forming a vacuum inside the concave-convex portion curved outwardly in the thickness direction.

The vacuum jacket may be integrally formed by welding the plurality of smooth portions, and a welding line formed on the outer surface of the vacuum jacket may be provided in the internal space of the vacuum jacket and may be formed at a position coincident with the internal discharge space.

The vacuum jacket may be integrally formed by welding the plurality of smooth portions, and the vacuum heat-insulation device may further include a high-temperature heat-insulation material provided inside the welding line formed on the outer surface of the vacuum jacket to prevent thermal deformation of the low-temperature heat-insulation layer near the welding line.

The vacuum jacket may include a first vacuum jacket surrounding the outer surface of the low-temperature heat-insulation layer and a second vacuum jacket provided to surround an outer surface of the first vacuum jacket, and the vacuum heat-insulation device may further include a spacer interposed between the first vacuum jacket and the second vacuum jacket to separate the first vacuum jacket and the second vacuum jacket from each other by a predetermined distance.

The vacuum jacket may include a flexible portion surrounding the outer surface of the low-temperature heat-insulation layer and having the flexible structure, and a robust portion in which at least a portion of the vacuum jacket having a robust structure supports the vacuum heat-insulation device.

The low-temperature tank may be made of a polyhedron, the flexible portion may be formed to surround the outer surface of the low-temperature heat-insulation layer forming a plane of the vacuum jacket, and the robust portion may be formed to surround the outer surface of the low-temperature heat-insulation layer forming a corner of the vacuum jacket.

The vacuum jacket may be configured to form an internal discharge space forming a flow path for forming a vacuum inside the robust portion.

The robust portion may be formed to surround the outer surface of the low-temperature heat-insulation layer constituting a lower portion of the vacuum jacket, and support a bottom surface of the vacuum heat-insulation device.

The vacuum heat-insulation device may further include a tank support body formed to support the low-temperature tank in a floating state, and separate a lower end of the vacuum jacket from the ground by a predetermined distance.

The tank support body may include: a tank hanger connected to the upper surface of the low-temperature tank, an upper support body that supports the tank hanger and forms a portion of the vacuum jacket, and a side support body that extends upwardly such that the lower end of the vacuum jacket is spaced apart from the ground to support the upper support body.

The tank support body may include: a tank hanger connected to a side surface of the low-temperature tank, and a side support body that forms a portion of the vacuum jacket and extends upwardly so that the lower end of the vacuum jacket is spaced apart from the ground to support the tank hanger.

Modes

Since the present disclosure may be variously modified and have several embodiments, specific embodiments will be illustrated in the accompanying drawings and be described in detail. However, it is to be understood that the present is not limited to a specific embodiment, but includes all modifications, equivalents, and substitutions without departing from the scope and spirit of the present disclosure.

It is to be understood that when one element is referred to as being "coupled to" or "connected to" another element, it may be directly coupled to or directly connected to another element or be coupled to or connected to another element while having the other element interposed therebetween.

Unless otherwise defined, all terms, including technical or scientific terms, used herein have the same meaning as commonly understood by one of ordinary skill in the art to which the present disclosure belongs.

It should be interpreted that terms defined by a generally used dictionary are identical with the meanings within the context of the related art, and they should not be ideally or excessively formally interpreted unless the context clearly dictates otherwise.

Hereinafter, a technical spirit of the present disclosure will be described in more detail with reference to the accompanying drawings.

The accompanying drawings are only examples shown to describe the technical spirit of the present disclosure in more detail, and therefore, the technical spirit of the present is not limited to the form of the accompanying drawings.

Figure 2:
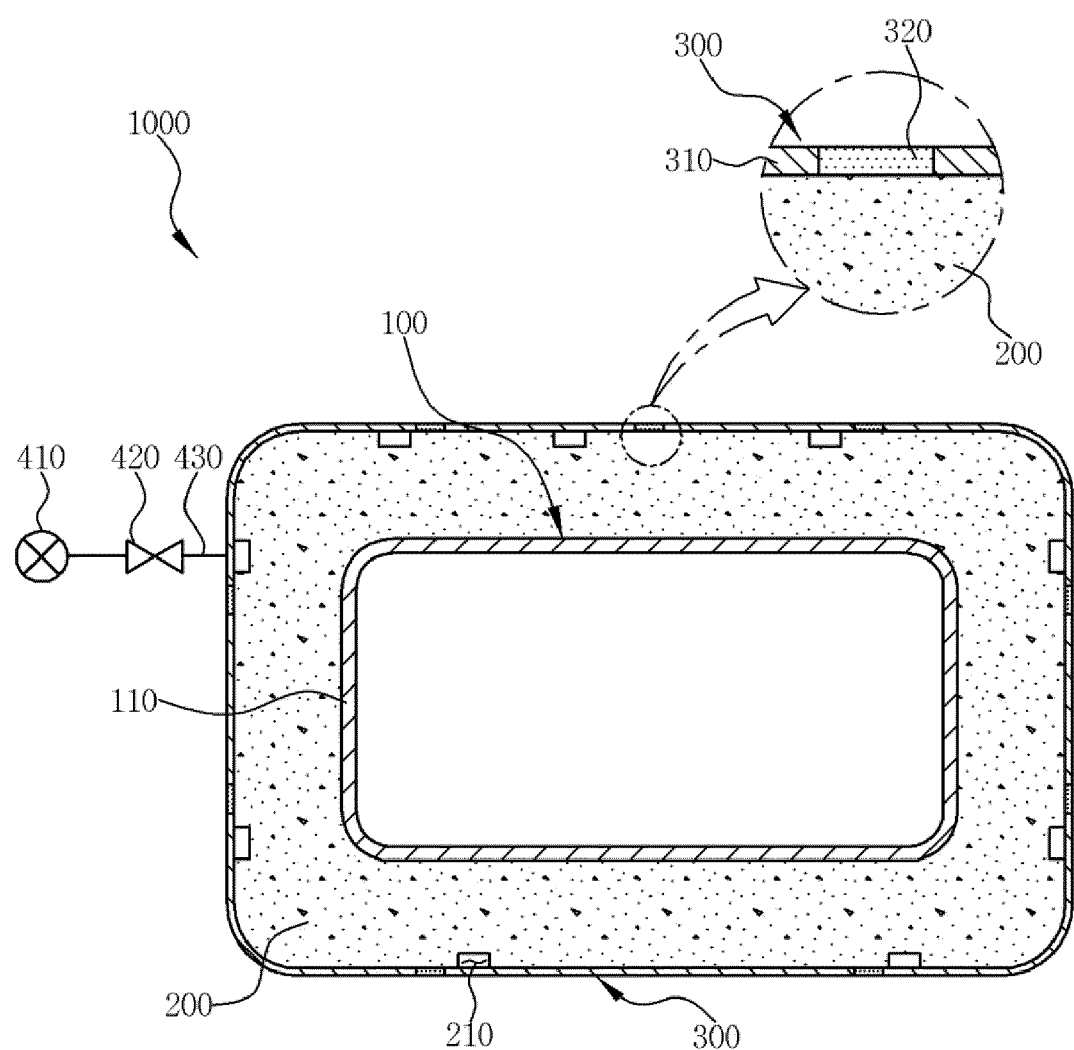
FIG. 2 is a cross-sectional view illustrating a vacuum heat-insulation device according to a first embodiment of the present disclosure.

FIG. 1 is a perspective view illustrating a vacuum heat-insulation device according to an embodiment of the present disclosure and FIG. 2 is a cross-sectional view illustrating a vacuum heat-insulation device according to a first embodiment of the present disclosure. Referring to FIGS. 1 and 2, a vacuum heat-insulation device 1000 according to an embodiment of the present disclosure may include a low-temperature tank 100 having a storage space for accommodating an ultra-low-temperature fluid therein, a low-temperature heat-insulation layer 200 provided to surround an outer shell 110 of the low-temperature tank, a vacuum jacket 300 that is formed to surround an outer surface of the low-temperature heat-insulation layer 200 and maintains airtightness with the outside, and a vacuum pump 410 connected to an internal space of the vacuum jacket 300 to maintain the low-temperature heat-insulation layer 200 interposed in the inner space in a vacuum state.

In this case, the vacuum heat-insulation device 1000 may maintain the internal space of the vacuum jacket 300 provided with the low-temperature heat-insulation layer 200 at a constant vacuum pressure to suck a gas or moisture remaining therein and discharge the gas or moisture to the outside, thereby further increasing an insulation performance of the low-temperature heat-insulation layer 200. Here, when the pressure of the low-temperature heat-insulation layer 200 is maintained in a vacuum, the low-temperature heat-insulation layer 200 receives a compression of 1 atmosphere, and it is necessary to use a material having sufficient compressive strength so that compressibility is not deteriorated. It is possible to secure sufficient insulation performance and compressive strength by using a reinforced polymer (reinforced poly urethane foam: R-PUF). In addition, the applicant confirmed that when the pressure of the low-temperature heat-insulation layer 200 was maintained in the vacuum state, thermal conductivity of the low-temperature heat-insulation layer 200 is reduced to less than half that of the low-temperature heat-insulation layer placed under a pressure of 100 KPa. Here, the operation of the vacuum pump 410 for maintaining the internal space at the vacuum pressure means when the ultra-low-temperature fluid is stored in the low-temperature tank 100, and the operation of the vacuum pump 410 may be operated and controlled appropriately for operation, testing, or maintenance of the low-temperature tank 100.

In certain embodiments, the outer shell 110 of the low-temperature tank 100 is designed to withstand the static pressure and dynamic pressure of the ultra-low-temperature fluid stored therein, and is made of a sealed integral body so that the fluid inside the tank does not leak. The vacuum jacket 300 of the vacuum heat-insulation device 1000 of the present disclosure is made to have a flexible structure in which at least a portion thereof may be contracted or expanded, and is thus formed to deform the outer surface corresponding to the internal space that is deformed according to the contraction or expansion of the outer shell 110 of the low-temperature tank 100 or the low-temperature heat-insulation layer 200.

That is, as described above, in the vacuum heat-insulation device 1000 of the present disclosure, the vacuum jacket 300 may be sealed to prevent air from flowing into the low-temperature heat-insulation layer 200 interposed therein, and as the vacuum jacket 300 constituting the outer surface of the low-temperature tank 100 contracts or expands in preparation for thermal contraction, the outer shell 110 of the low-temperature tank 100 may be made of an ultra-low-temperature metal material (nickel steel, stainless steel, aluminum, etc.) capable of supporting the pressure of the ultra-low-temperature fluid stored therein. It is possible to provide a V-PUF Insulation type vacuum heat-insulation device capable of overcoming the disadvantages of a membrane type low-temperature tank that may not support itself because of having a conventional corrugated surface inside, and rely on the hull, and performing contraction and expansion of the tank according to the temperature of the internal fluid.

In this case, the vacuum pump 410 may be configured in plurality in order to maintain a vacuum in the entire area according to the standard of the low-temperature tank 100, and may include an exhaust pipe 430 connected to the inside of the vacuum jacket 300, and an exhaust valve 420 for opening and closing the exhaust pipe 430. The vacuum pump 410 may be utilized for a vacuum inside the vacuum jacket 300 using a commercially used vacuum pump.

In addition, the vacuum jacket 300 may include a plurality of smooth portions 310 surrounding the outer surface of the low-temperature heat-insulation layer 200 and made of flat plates spaced apart from each other by a predetermined distance, and a deformable joint portion 320 formed between the plurality of smooth portions 310 and having the flexible structure. In this case, in order to contract or expand the plurality of smooth portions 310 as the internal space of the vacuum jacket 300 contracts or expands, the adjacent deformable joint portion 320 is pressed, and accordingly, the deformable joint portion 320 may be contracted or expanded to respond to deformation inside the vacuum jacket 300. In this case, the flat plate may be made of metal or plastic having strong rigidity against the vacuum pressure inside the vacuum jacket 300 and low gas permeability. Here, the vacuum jacket 300 operates the vacuum pump 410 connected at the time of manufacturing to form the internal space in a vacuum state, and thereafter, the vacuum jacket 300 is sealed to maintain the vacuum state, and a separate measuring means capable of measuring the degree of vacuum in the internal space of the vacuum jacket 300 is provided. Thereafter, by re-operating the vacuum pump 410 when the degree of vacuum in the internal space of the vacuum jacket 300 is lowered, the vacuum state can be maintained at least when the ultra-low-temperature fluid is stored in the low-temperature tank 100.

First Embodiment

FIGS. 3A-B to 5A-B are cross-sectional views illustrating various modified examples of the deformable joint portion 320 according to the first embodiment of the present disclosure. Referring to FIGS. 1 to 5A-B, the deformable joint portion 320 according to the first embodiment of the present disclosure may connect the plurality of smooth portions 310, and may be formed of a polymer elastic body 231 that is stretchable in response to the deformation of the internal space of the vacuum jacket 300.

Figure 3A:
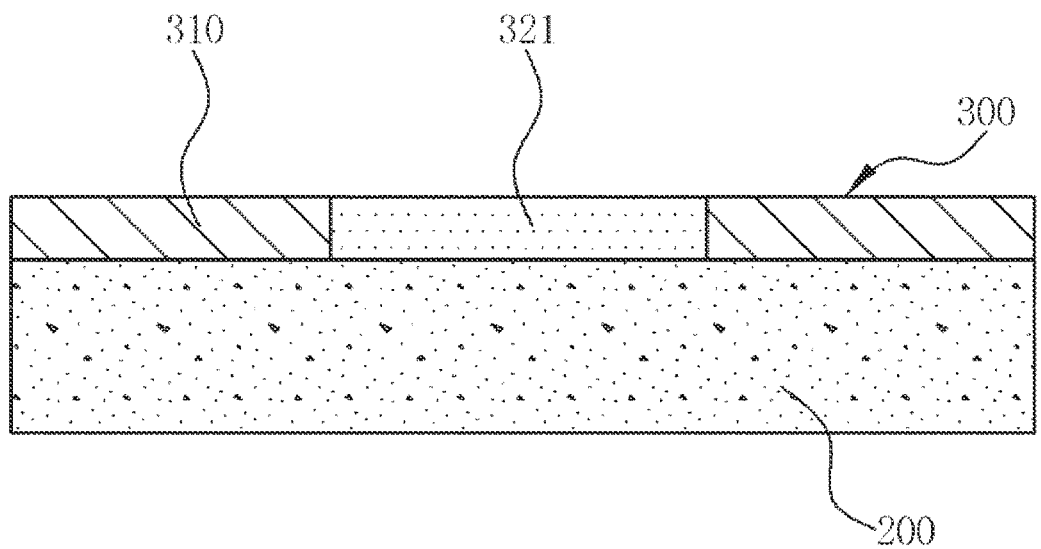
FIGS. 3A-B to 5A-B are cross-sectional views illustrating various modified examples of a deformable joint portion according to the first embodiment of the present disclosure.
Figure 3B:
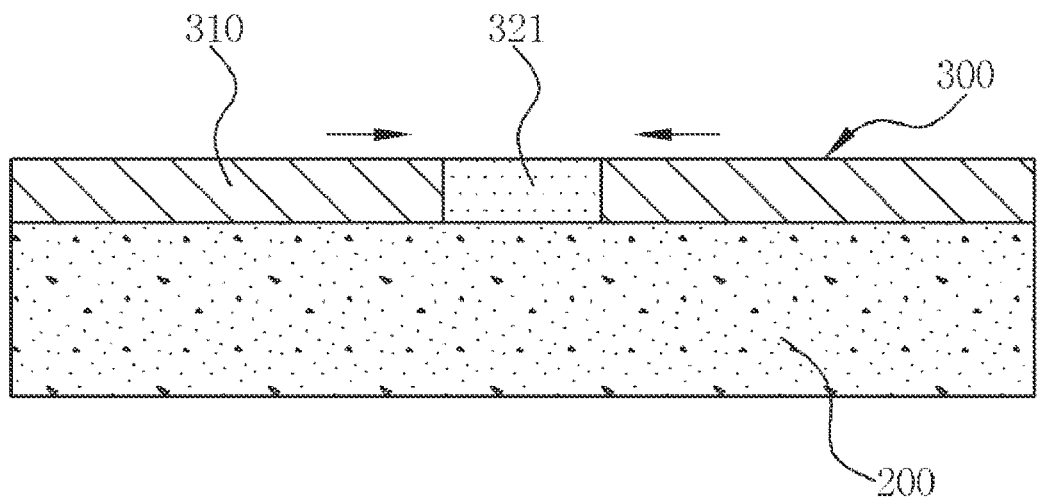

Referring to FIGS. 3A-B, the polymer elastic body 231 may be interposed between the plurality of smooth portions 310 and may be bonded to outer side ends of the plurality of smooth portions 310 in a width direction thereof, thereby connecting the plurality of smooth portions 310 to each other and performing the sealing of the vacuum jacket 300. In this case, as illustrated in of FIG. 3B, when the inside of the vacuum jacket 300 is contracted, the polymer elastic body 231 is compressed so that the space between the plurality of smooth portions 310 that are adjacent to each other is narrowed, which may respond to deformation inside the vacuum jacket 300.

Figure 4A:
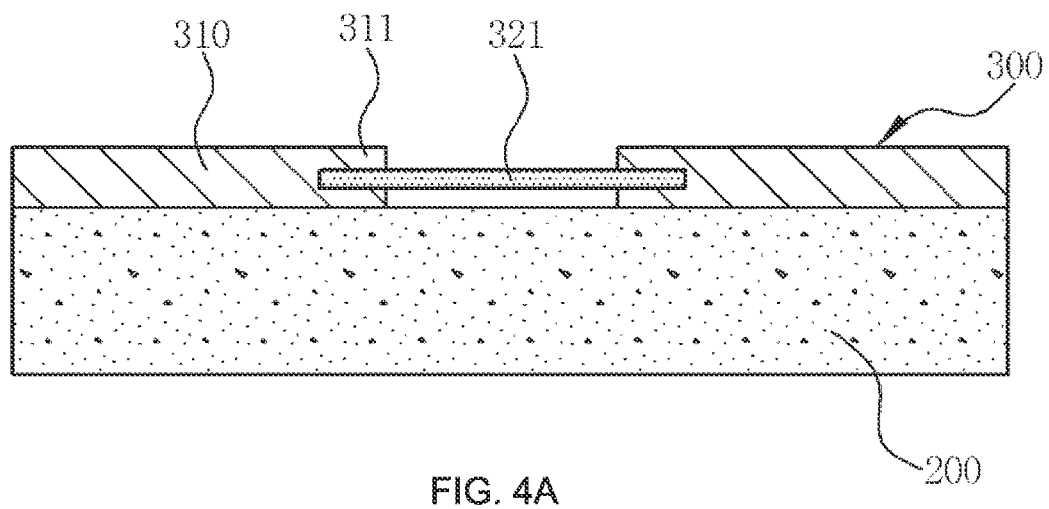
Figure 4B:
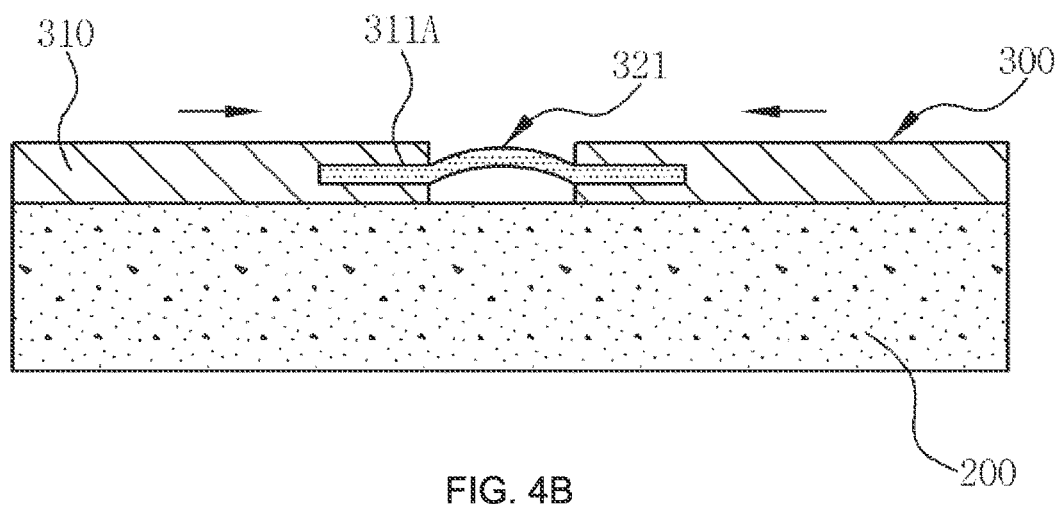

In this case, as illustrated in FIGS. 4A-B, in order to increase the contact area between the polymer elastic body 321 and an outer side end 311 of the smooth portion 310, a recess groove 311A formed so that a portion of the polymer elastic body 321 is recessed may be formed on the outer side end 311 of the smooth portion 310 in the width direction, thereby increasing the contact area between the polymer elastic body 321 and the smooth portion 310, and increasing a sealing power of the vacuum jacket 300. In addition, since the spaces in which the smooth portions 310 are disposed are formed in an integral mesh shape forming a hollow mesh and are installed to surround the outer surface of the low-temperature heat-insulation layer 200, the polymer elastic body 321 surrounding the low-temperature heat-insulation layer 200 may more easily perform the coupling with the smooth portions 310. In addition, the polymer elastic body 321 is contracted to be curved inwardly opposite to the low-temperature heat-insulation layer 200, and compresses the low-temperature heat-insulation layer 200 inwardly, thereby increasing adhesion between the low-temperature heat-insulation layer 200 and the outer shell 110 of the low-temperature tank 100.

Figure 5A:
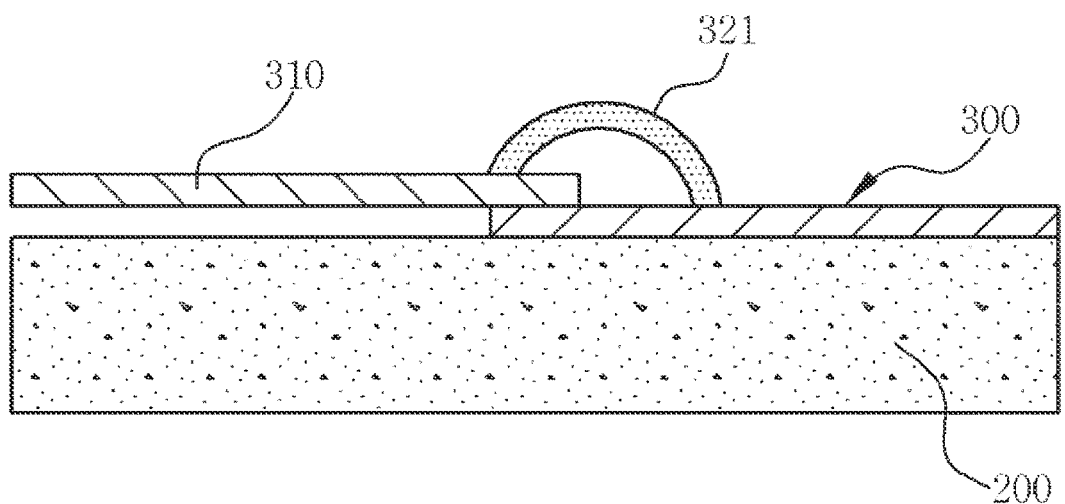
Figure 5B:
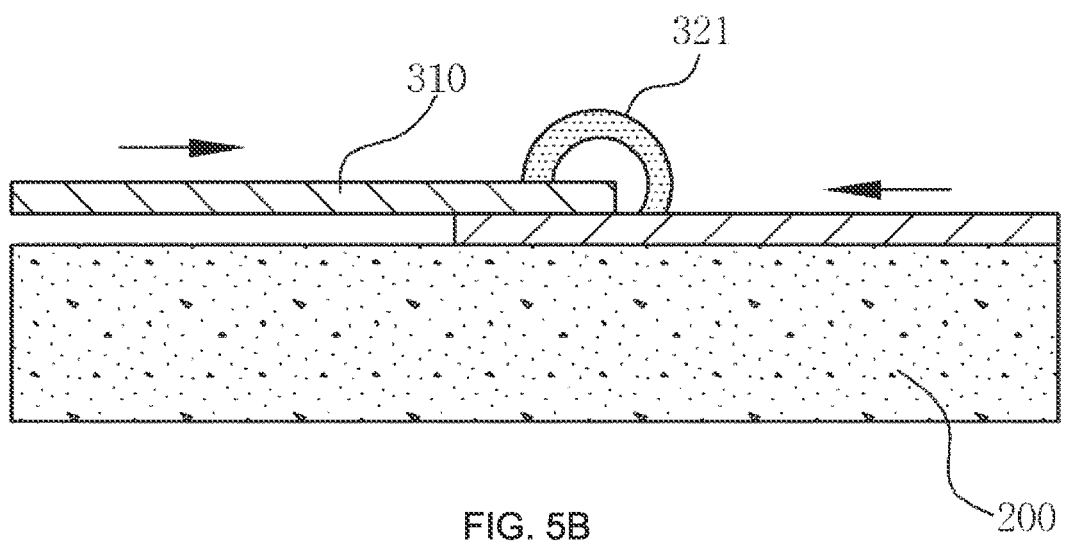

FIGS. 5A-B are an exemplary view illustrating another aspect of the coupling of the polymer elastic body 321 and the smooth portion 310 of the present disclosure. Referring to FIGS. 5A-B, the plurality of smooth portions 310 are provided to overlap with at least one adjacent smooth portion 310 in a thickness direction, such that when the internal space is deformed, the plurality of overlapped smooth portions 310 respond to the contraction or expansion of the internal space while being slid. The polymer elastic body 321 constituting the deformable joint portion 320 may be sealed to maintain the airtightness of the vacuum jacket 300 by being bonded to upper surfaces of the portions overlapped with the plurality of smooth portions 310, and may be contracted or expanded in response to the sliding of the smooth portions 310. In this case, the polymer elastic body 321 having the configuration described above may be formed in various shapes without departing from the gist of the present disclosure other than a shape of a semicircular donut curved toward the outside.

Second Embodiment

Figure 6:
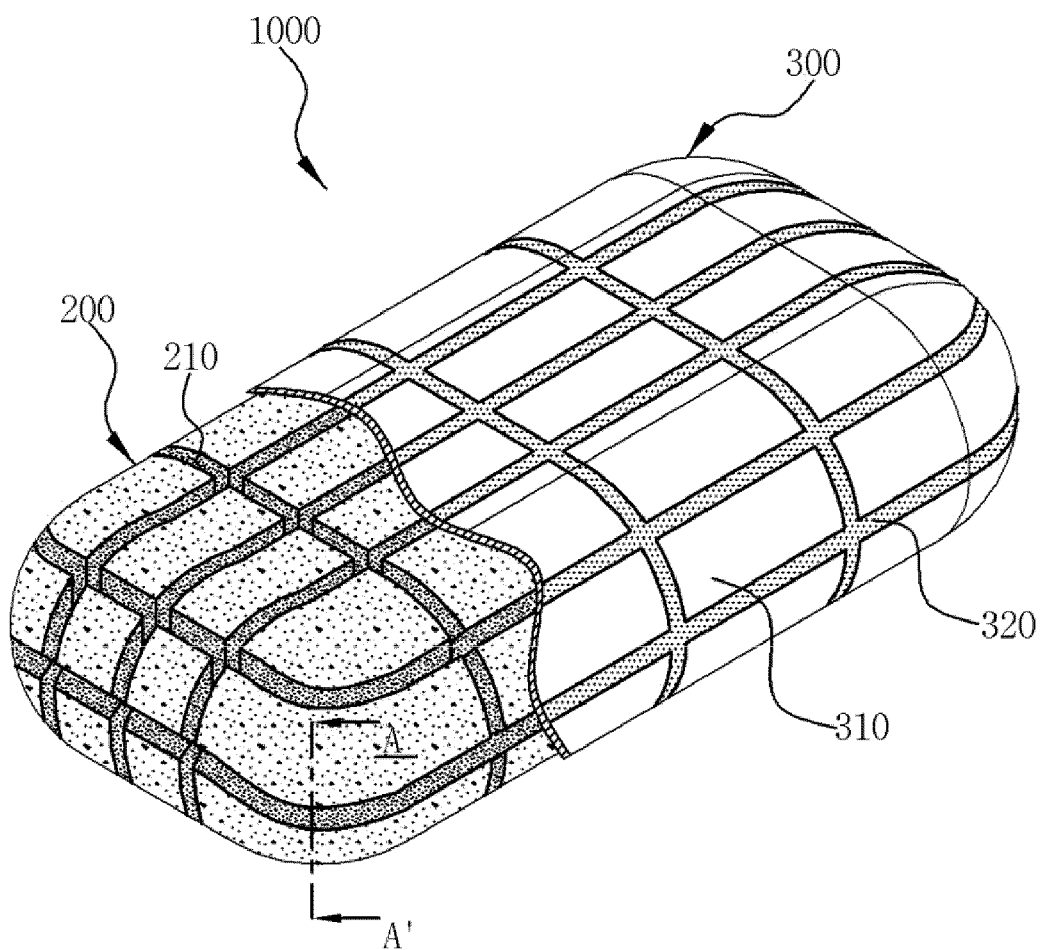
FIG. 6 is a perspective view illustrating a vacuum heat-insulation device according to a second embodiment of the present disclosure.
Figure 7A:
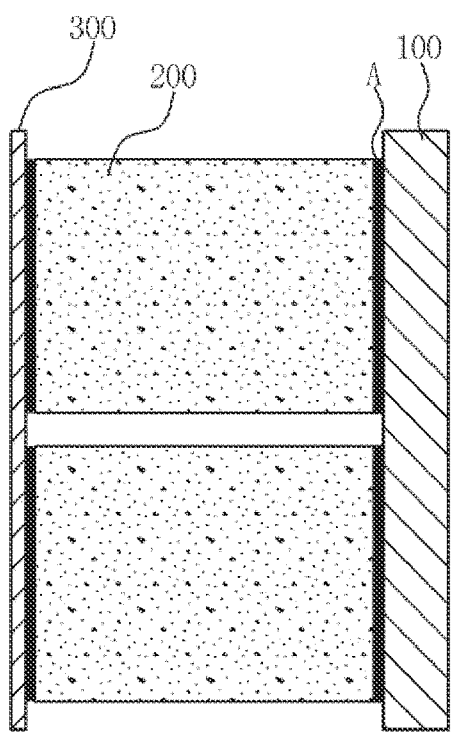
FIGS. 7A-B and 8A-B are cross-sectional views illustrating various modified examples of a low-temperature heat-insulation layer according to an embodiment of the present disclosure.
Figure 7B:
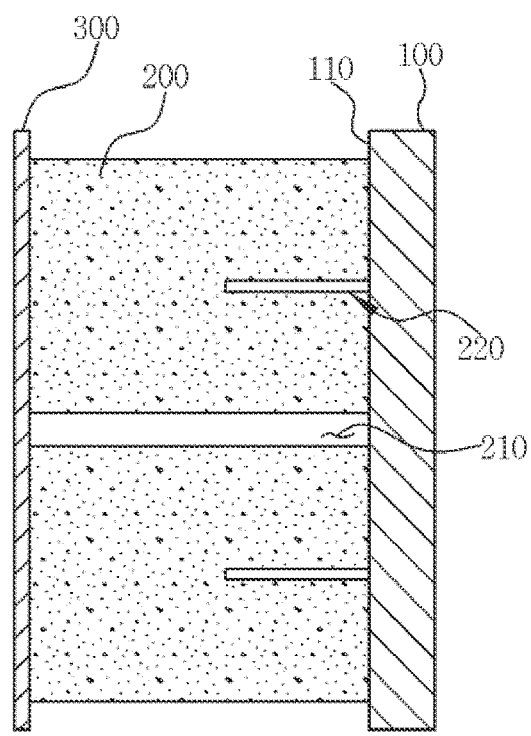
Figures 8A, 8B:
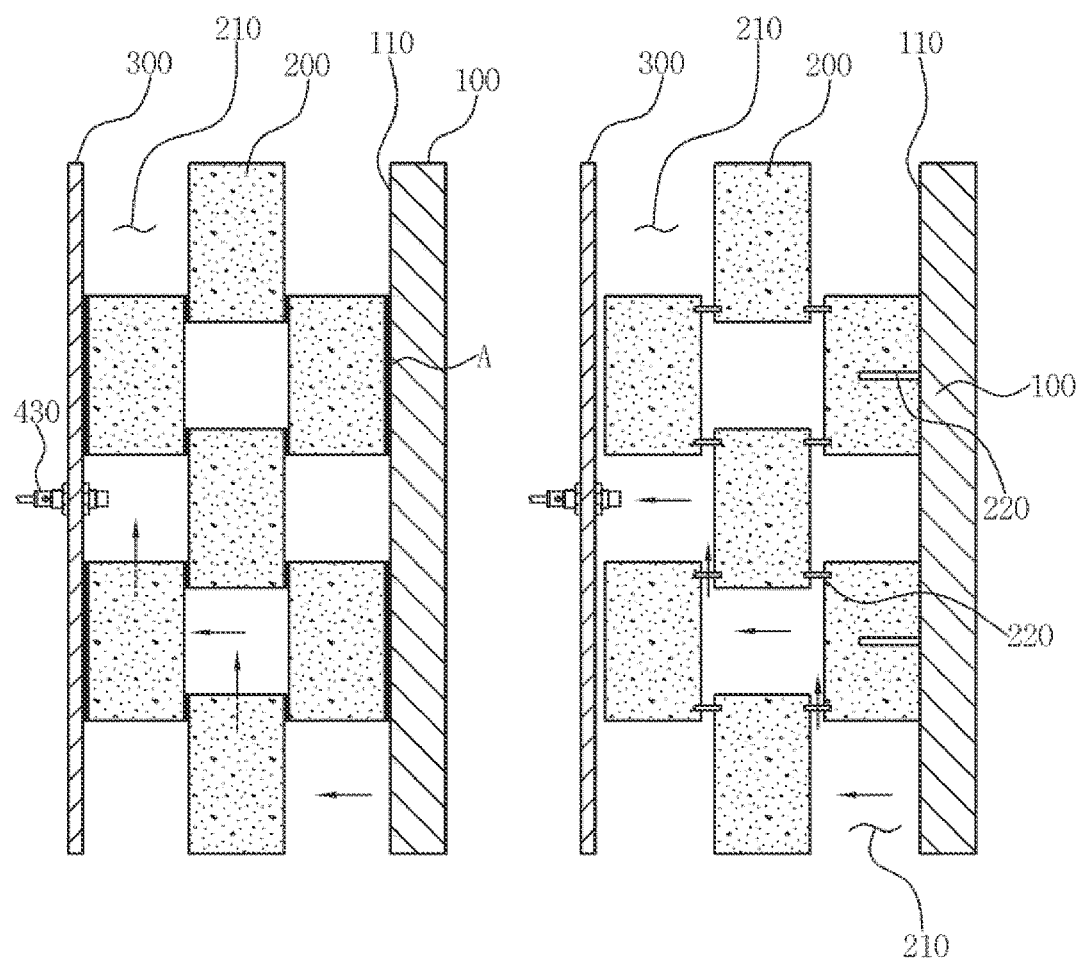
Figure 9A:
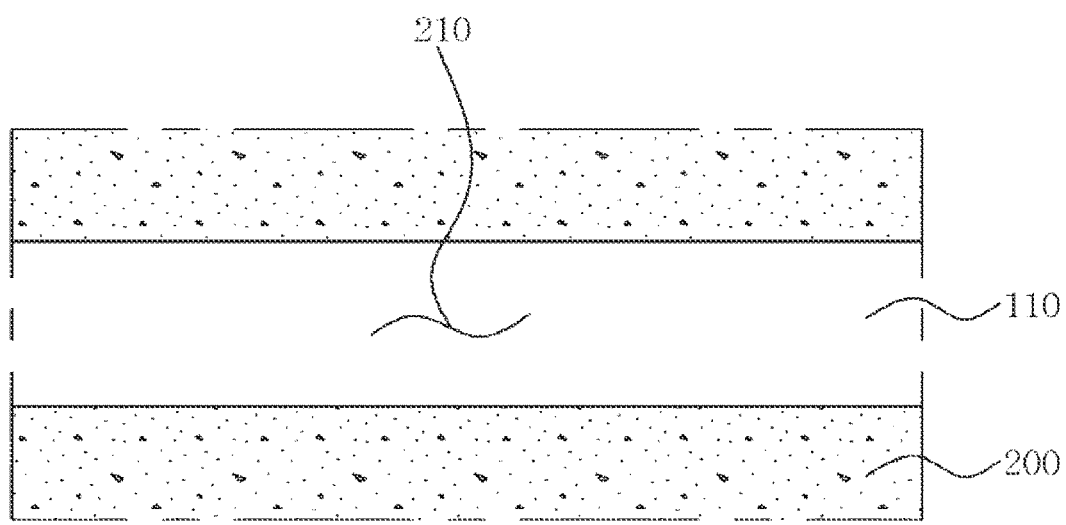
FIGS. 9A-B is a view illustrating various modified examples of an internal discharge space taken along section AA' in FIG. 6.
Figure 9B:
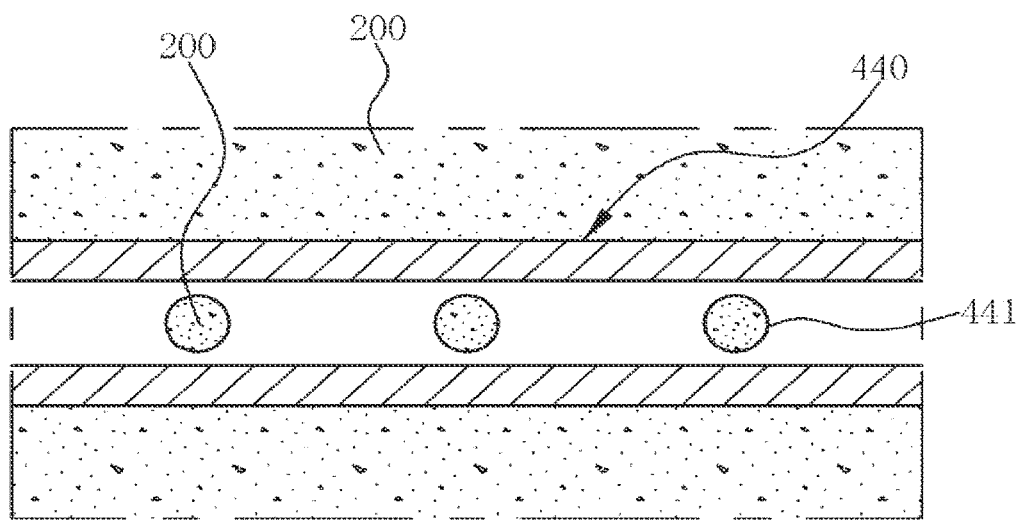

FIG. 6 is a perspective view illustrating a vacuum heat-insulation device 1000 according to a second embodiment of the present disclosure, FIGS. 7A-B and 8A-B are cross-sectional views illustrating various modified examples of a low-temperature heat-insulation layer 200 according to the second embodiment of the present disclosure, and FIGS. 9A-B are a view illustrating various modified examples of an internal discharge space 210 taken along section AA' in FIG. 6. Referring to FIGS. 6 to 9B, a low-temperature heat-insulation layer 200 of a vacuum heat-insulation device 1000 according to the second embodiment of the present disclosure is provided in plural, and the plurality of low-temperature heat-insulation layers 200 may be provided to be spaced apart from each other to form an internal discharge space 210 connected to the vacuum pump 410 and forming a flow path for forming a vacuum between the plurality of low-temperature heat-insulation layers 200 that are adjacent to each other.

The internal discharge space 210 is a configuration for inducing an internal exhaust fluid to form a vacuum inside the vacuum jacket 300, and may be formed by perforation of a portion of the low-temperature heat-insulation layer 200. In an embodiment, the low-temperature heat-insulation layer 200 may be partitioned into plural, and a spaced space between the plurality of partitioned low-temperature heat-insulation layers 200 may be used. In this case, the vacuum pump 410 may be connected to any portion of the internal discharge space 210 formed inside the vacuum jacket 300 to suck the internal fluid for vacuum of the low temperature heat-insulation layer 200. In this case, as a size of the low-temperature tank 100 increases, because a surface area of the low-temperature heat-insulation layer 200 surrounding the outer shell 110 of the low-temperature tank 100 increases, it is preferable that a plurality of exhaust pipes 430 for sucking the internal fluid for a uniform vacuum of the low-temperature heat-insulation layer 200 are configured to be connected to the vacuum jacket 300.

In this case, of FIG. 7A is a view illustrating the low-temperature heat-insulation layer 200 chemically attached to the outer shell 110 of the low-temperature tank 100 by bonding, and FIG. 7B is a view illustrating the low-temperature heat-insulation layer 200 physically attached to the outer shell 110 of the low-temperature tank 100 by a fixing bolt 220 fixed by welding or perforation. Referring to FIGS. 7A-B, the plurality of low-temperature heat-insulation layers 200 may be attached to an outer surface of the outer shell 110 of the low-temperature tank 100 and an inner surface of the vacuum jacket 300 by being bonded thereto, but excessive use of adhesive may be a problem when forming the vacuum of the low-temperature heat-insulation layer 200 or contracting the low-temperature tank. Accordingly, the low-temperature heat-insulation layers 200 are fixed to the outer shell 110 of the low-temperature tank 100 by using the fixing bolt 220, and may be thus disposed to be spaced apart to form the internal discharge space 210 between the adjacent low-temperature heat-insulation layers 200.

FIGS. 8A-B is a view illustrating an aspect in which the plurality of low-temperature heat-insulation layers 200 are provided to form a multiple layer in a thickness direction. In FIG. 8A, any one low-temperature heat-insulation layer 200 and the other low-temperature heat-insulation layer 200 provided to form the multiple layer in the thickness direction are arranged so that only a portion of the outside thereof is bonded, and may be bonded to form a continuous internal discharge space 210 in which an interlayer internal fluid stacked in the thickness direction may move. In this case, the flow of the internal fluid alternately moves in a direction perpendicular to each other between the layers stacked in the thickness direction to move from the low-temperature tank 100 to the vacuum jacket 300 direction, and is discharged to the outside through the exhaust pipe 430 provided in the internal discharge space 210.

In this case, referring to FIG. 8B as another aspect of the present disclosure, the plurality of low-temperature heat-insulation layers 200 are provided to form a multiple layer in the thickness direction, and may be fixed to at least one of the outer shell 110 of the low-temperature tank 100, the vacuum jacket 300, or the adjacent low-temperature heat-insulation layer 200 using the fixing bolt 220 to be spaced apart from each other by a predetermined distance, thereby forming the internal discharge space 210 in which the internal fluid may be more smoothly discharged.

FIGS. 9A-B are a cross-sectional view illustrating various modified examples of an internal discharge space 210 taken along section AA' in FIG. 6. Referring to FIGS. 9A-B, the vacuum heat-insulation device 1000 may further include a discharge pipe 440 provided in the internal discharge space 210 and having a suction hole 441 that is formed on an outer circumferential surface and communicates with the internal space of the vacuum jacket 300.

The discharge pipe 440 is configured in plural to pass between the internal discharge spaces 210 partitioned in the low-temperature heat-insulation layer 200, and may be continuously connected to each other using a pipe joint portion such as an elbow pipe or a cross pipe. In this case, an exhaust pipe 430 connected to the vacuum pump 410 is connected to a portion of the discharge pipe 440 to eject the internal fluid flowing into the discharge pipe 440 to the outside, and vacuum pressure may be applied to the low-temperature heat-insulation layer 200 by sucking the internal fluid remaining in the low-temperature heat-insulation layer 200 through the suction hole 441 punched in the outer surface so that the inside and the outside of the discharge pipe 400 communicate with each other.

Third Embodiment

Figure 10:
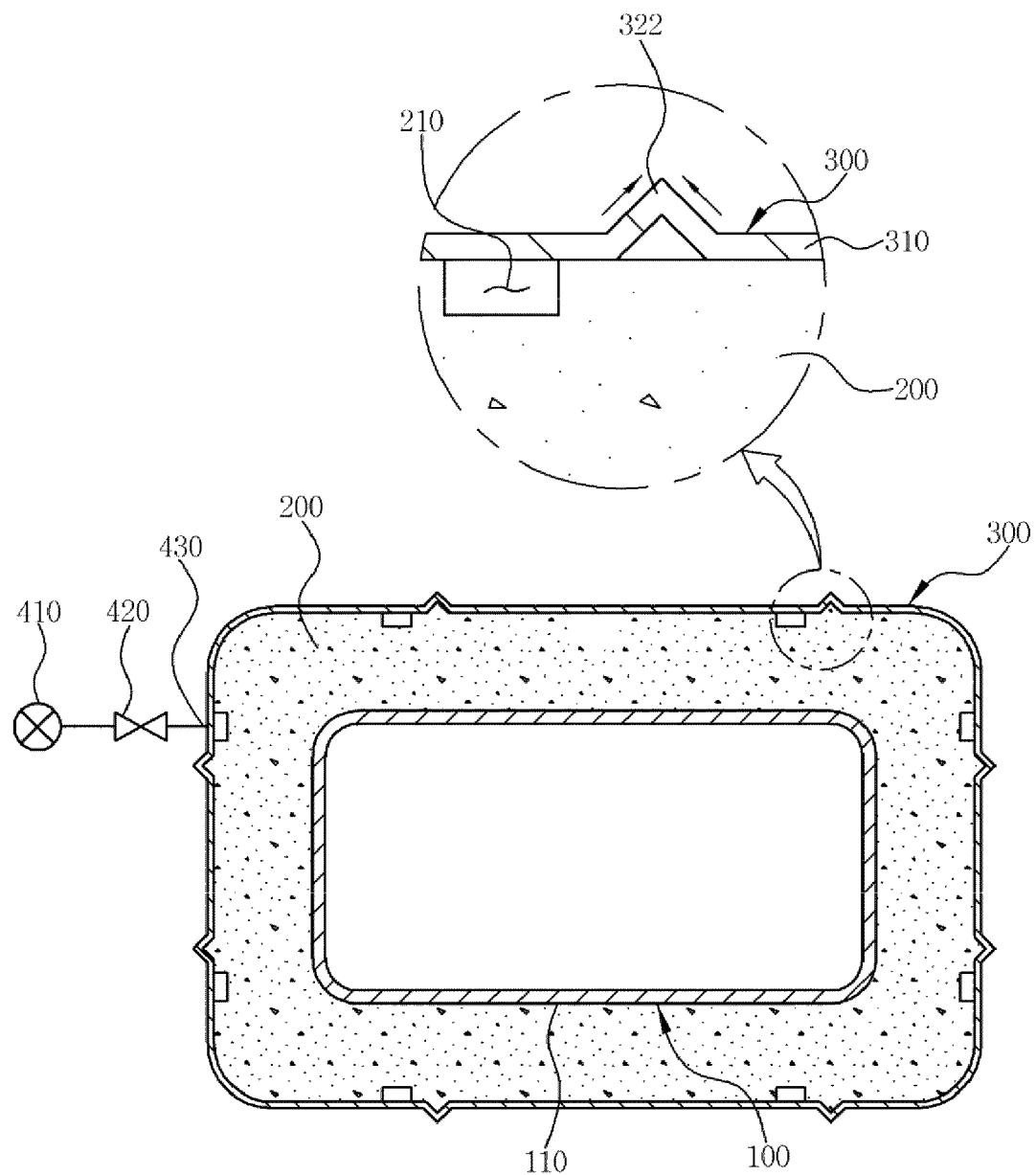
FIG. 10 is a cross-sectional view illustrating a vacuum heat-insulation device according to a third embodiment of the present disclosure.

FIG. 10 is a cross-sectional view illustrating a vacuum heat-insulation device 1000 according to a third embodiment of the present disclosure. Referring to FIG. 10, the deformable joint portion 320 of the vacuum heat-insulation device 1000 according to the third embodiment of the present disclosure is integrally formed with the plurality of smooth portions 310, and forms a concave-convex portion 322 curved outwardly in the thickness direction. The concave-convex portion 322 may be deformed according to the contraction or expansion of the internal space of the vacuum jacket 300.

In this case, the vacuum jacket 300 may be entirely formed of steel to reinforce the outside of the vacuum heat-insulation device 1000, and the concave-convex portion 322 is bent outwardly in the thickness direction and may be deformed simultaneously with contraction or expansion according to the contraction or expansion of the internal space of the vacuum jacket 300. In more detail, when the internal space of the vacuum jacket 300 is contracted, the vacuum jacket 300 is contracted to the outside in which the concave-convex portion 322 of the vacuum jacket 300 is curved, and when the internal space is expanded, a curved inclination of the concave-convex portion 322 is gently stretched, and as a result, the vacuum jacket 300 is deformed to respond to the expansion of the internal space. In addition, the concave-convex portion 322 may concentrate condensation liquid water generated on the outer surface of the vacuum jacket 300 and induce the condensation liquid water to flow in a direction of its own weight.

In addition, the vacuum jacket 300 may be manufactured to form an integral body through welding between a plurality of smooth portions 310 or concave-convex portions 322. In this case, in order to prevent thermal deformation and damage of the low-temperature heat-insulation layer 200 due to heat due to welding, a high-temperature heat-insulation material 500 is provided inside the vicinity of the welding, so that the damage to the low-temperature heat-insulation layer 200 may be prevented.

Hereinafter, various modified examples between the internal discharge space 210, the low-temperature heat-insulation layer 200, and the high-temperature heat-insulation material 500 of the vacuum heat-insulation device 1000 according to the third embodiment of the present disclosure will be described with reference to FIGS. 11 to 14.

Figure 11:
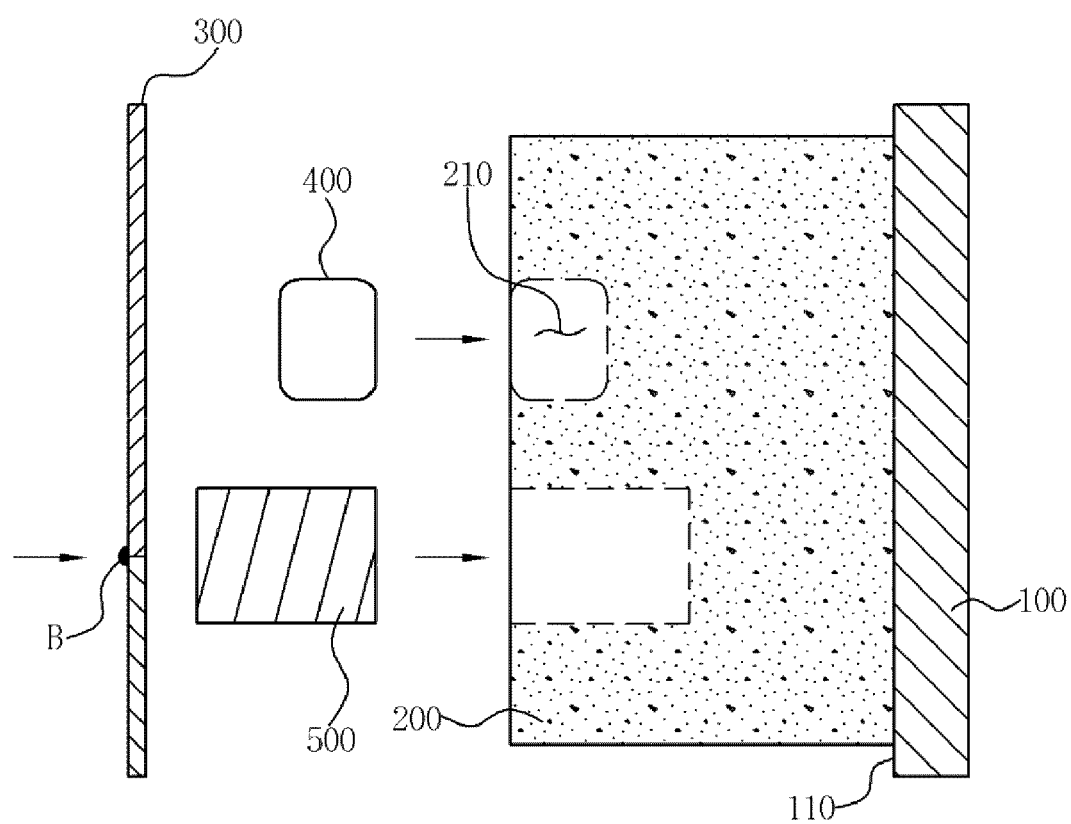
FIGS. 11 to 15 are cross-sectional views illustrating various modified examples of the vacuum heat-insulation device according to the third embodiment of the present disclosure.

First, as illustrated in FIG. 11, the vacuum jacket 300 is integrally formed by welding a plurality of smooth portions 310 to each other, and in some embodiments, the high-temperature heat-insulation material 500 is provided inside a welding line B where the welding is performed. In this case, the high-temperature heat-insulation material 500 may be made of a heat-resistant material such as glass fiber, carbonized fiber, or silica fiber, and should not to be deformed by heat of welding, but to use a light material so as not to excessively increase the total weight of the vacuum heat-insulation device 1000.

Figure 12A:
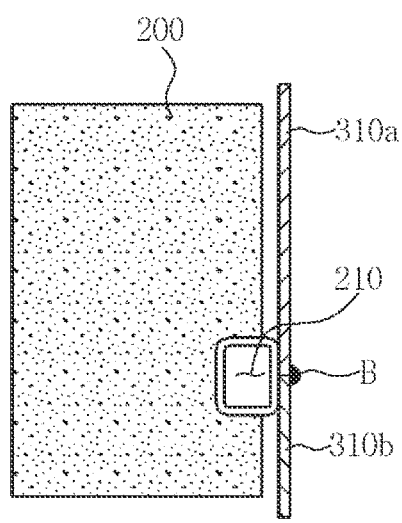
Figure 12B:
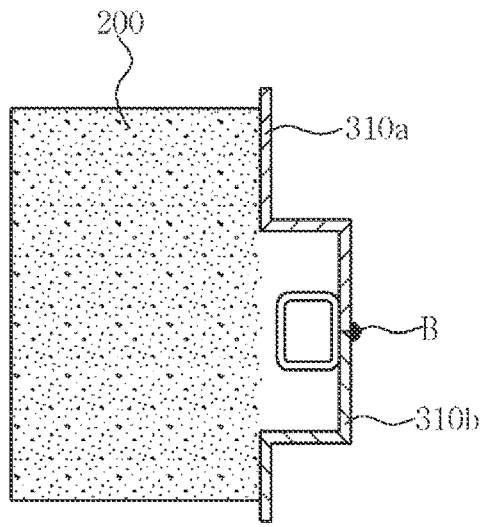
Figure 12C:
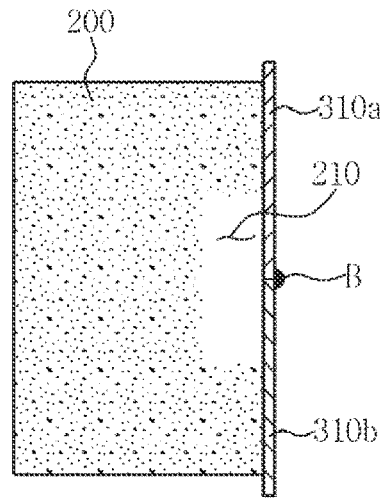
Figure 12D:
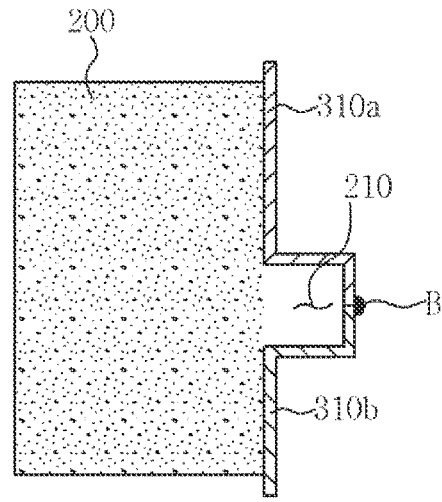

In this case, when the internal discharge space 210 formed on the outer surface of the low-temperature heat-insulation layer 200 is sufficiently large, the damage to the low-temperature heat-insulation layer 200 due to welding may be prevented even without the high-temperature heat-insulation material 500. FIGS. 12A-D are a view illustrating a modified example of the vacuum jacket 300 according to the case in which the above-described internal discharge space 210 is sufficiently large. FIGS. 12A-B illustrate modified examples in which the discharge pipe 440 is provided in the internal discharge space 210, and FIGS. 12C-D illustrate modified examples in which the discharge pipe 440 is not provided in the internal discharge space 210.

Referring to FIG. 12A, the welding line B of the vacuum jacket 300 is provided to coincide with the discharge pipe 440, and the discharge pipe 440 is formed to separate the internal surface of the vacuum jacket 300 and the outer surface of the low-temperature heat-insulation layer 200 by a predetermined distance, such that the heat of welding due to welding of the vacuum jacket 300 may not be transferred to the low-temperature heat-insulation layer 200. In certain embodiments, the discharge pipe 440 is formed in a sufficiently large size to minimize heat transfer along the discharge pipe 440 or is made of a material having heat resistance. Referring to FIG. 12B, a portion of the vacuum jacket 300 is bent outwardly to form an internal discharge space 210 inside the bent vacuum jacket 300, and in this case, by matching the welding line B to be in contact with an upper surface of the discharge pipe 440 provided in the formed internal discharge space 210, it is possible to prevent damage to the low-temperature heat-insulation layer 200.

Referring to FIG. 12C, the internal discharge space 210 is formed to be sufficiently wide on the outer surface of the low-temperature heat-insulation layer 200, and by welding the adjacent smooth portions 310a and 310b so that the formed internal discharge space 210 and the welding line B coincide, it is possible to prevent damage to the low-temperature heat-insulation layer 200. As illustrated in FIG. 12D, by welding the adjacent smooth portions 310a and 310b so that the welding line B coincides with the internal discharge space 210 formed inside the vacuum jacket 300, which is partially bent to the outside, it is possible to prevent damage to the low-temperature heat-insulation layer 200.

Figure 13A:
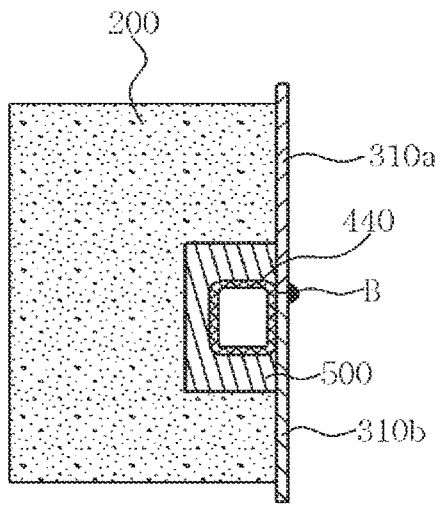
Figure 13B:
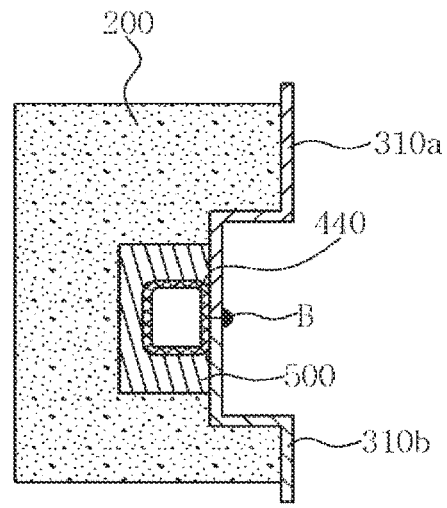
Figure 13C:
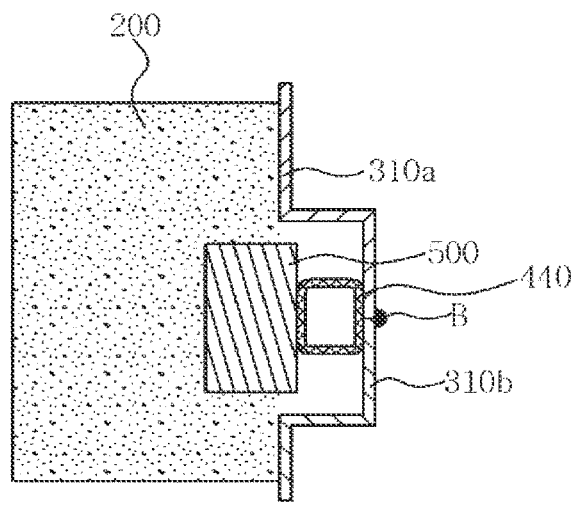

FIGS. 13A-C and 14D-E are views illustrating modified examples of the vacuum heat-insulation device 1000 in which the high-temperature heat-insulation material 500 is provided in the internal discharge space 210 to coincide with the welding line B. Referring to FIGS. 13A-C, the high-temperature heat-insulation material 500 may be provided inside the vacuum jacket 300 coincident with the discharge pipe 440 having the internal discharge space 210 and the welding line B, and the high-temperature heat-insulation material 500 may be formed so that the inside thereof is recessed to accommodate the discharge pipe 440 (FIGS. 13A-B), and may be configured so that the discharge pipe 440 is provided on the outside of the high-temperature heat-insulation material 500 and the welding line B formed on the outer surface of the vacuum jacket 300 is formed at a position coincident with the high-temperature heat-insulation material 500 and the internal discharge space 210.

Figure 14D:
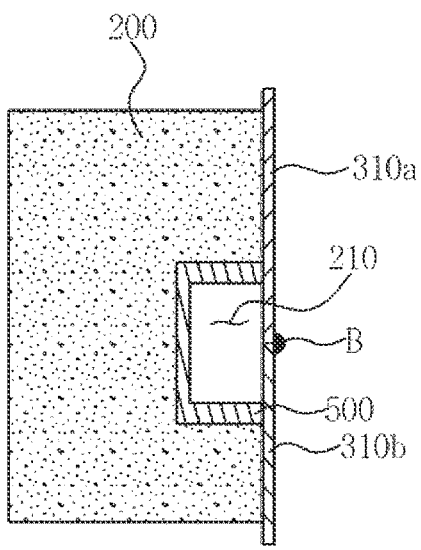
Figure 14E:
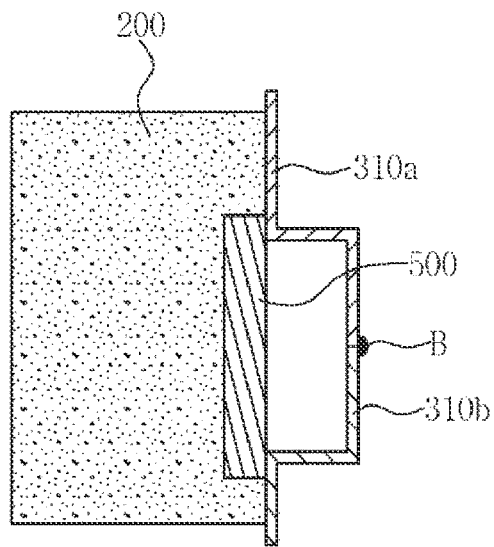

Alternatively, as illustrated in FIGS. 14D-E, by excluding the discharge pipe 440, the internal discharge space 210, the high-temperature heat-insulation material 500, and the welding line B are formed at the coincident position. In this case, the high-temperature heat-insulation material 500 may be partially recessed from the outside to the inside to form the internal discharge space 210 (FIG. 14D), or may be interposed (FIG. 14E) between the internal discharge space 210 formed inside the vacuum jacket 300 bent outwardly and the low-temperature heat-insulation layer 200, thereby preventing deformation and damage to the low-temperature heat-insulation layer 200 due to welding.

In certain embodiments, the high-temperature heat-insulation material 500 can be made of a material in which pores are formed so that the internal fluid remaining in the low-temperature heat-insulation layer 200 may be sucked by the vacuum pressure sucked from the vacuum pump 410, or that is woven with fibers to form pores through which the internal fluid may pass.

Figure 15:
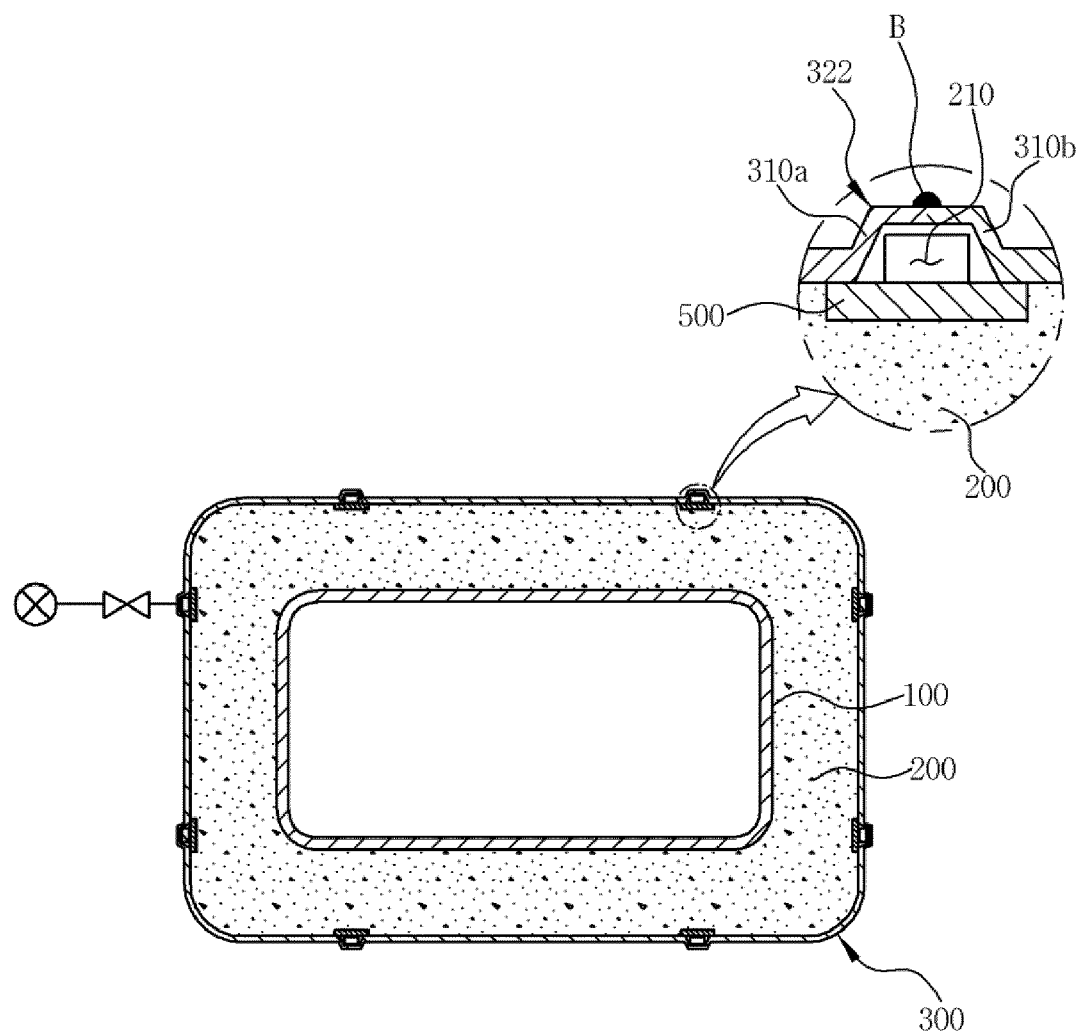

FIG. 15 is a cross-sectional view illustrating a modified example of the vacuum heat-insulation device 1000 according to the third embodiment of the present disclosure. Referring to FIG. 15, the deformable joint portion 320 includes the concave-convex portion 322 curved outwardly in the thickness direction, and an internal discharge space 210 that is connected to the vacuum pump 410 and forms a flow path for vacuum formation may be formed inside the concave-convex portion 322. In this case, the concave-convex portion 322 is formed by outwardly bending the outer side ends 310a and 310b of the smooth portion 310 and welding the outer side ends of the smooth portion 310 to adjacent outer side ends. In this case, the concave-convex portion 322 may be bent so that an angle formed between the outer side ends 310a and 310b of the smooth portion 310 constituting the concave-convex portion 322 and the outer surface of the inner low-temperature heat-insulation layer 200 forms an acute angle, thereby being contracted or expanded according to the deformation of the internal space of the vacuum jacket 300. Further, the installation operation of the vacuum heat-insulation device 1000 may be further simplified by arranging the internal discharge space 210 formed inside the concave-convex portion 322, the high-temperature heat-insulation material 500, and the welding line B to be formed at a position coincident with each other.

Figure 16:
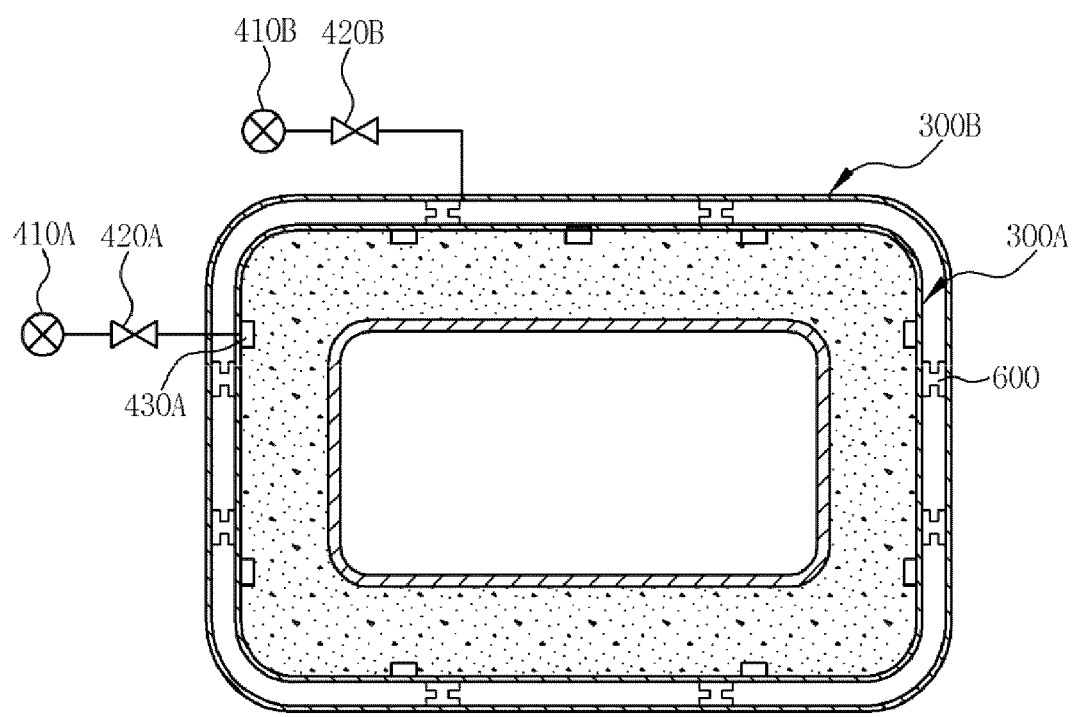
FIG. 16 is a cross-sectional view illustrating a vacuum jacket having a double structure according to an embodiment of the present disclosure.

FIG. 16 is a cross-sectional view illustrating a vacuum jacket having a double structure according to an embodiment of the present disclosure. Referring to FIG. 16, the vacuum heat-insulation device 1000 having a double vacuum heat-insulation structure may include a first vacuum jacket 300A surrounding the outer surface of the low-temperature heat-insulation layer 200 and a second vacuum jacket 300B provided to surround an outer surface of the first vacuum jacket 300A, and further include spacers 600 interposed between the first vacuum jacket 300A and the second vacuum jacket 300B to separate the first vacuum jacket 300A and the second vacuum jacket 300B from each other by a predetermined distance and provided to withstand a vacuum pressure of the spaced space.

In some embodiments, the first vacuum jacket 300A and the second vacuum jacket 300B are connected to separate exhaust pipes 430A and 430B, respectively, to have independent vacuum spaces. In this case, if the vacuum of the first vacuum jacket 300A is lost, the second vacuum jacket 300B is designed to maintain a vacuum state for a certain period of time or more to maintain stability during a transportation period of cargo.

Fourth Embodiment

FIGS. 17 to 21 are cross-sectional views illustrating a vacuum heat-insulation device according to a fourth embodiment of the present disclosure. Referring to FIGS. 17 to 21, in the vacuum heat-insulation device 1000 according to the fourth embodiment of the present disclosure, the vacuum jacket 300 may include a flexible portion 340 surrounding the outer surface of the low-temperature heat-insulation layer 200 and having the flexible structure, and a robust portion 330 in which at least a portion of the vacuum jacket 300 having a robust structure supports the vacuum heat-insulation device 1000. In this case, the robust structure means that the vacuum jacket 300 has a structure in which the vacuum jacket 300 including the robust portion 330 is formed to be coupled with a reinforcement material or a support body for supporting the vacuum heat-insulation device 1000 or to support a load of the vacuum heat-insulation device 1000 by itself. For example, the robust structure is made of invar steel constituting the outer shell 110 of the low-temperature tank 100, and the flexible portion 340 can be made of the above-described deformable joint portion 320.

Figure 17:
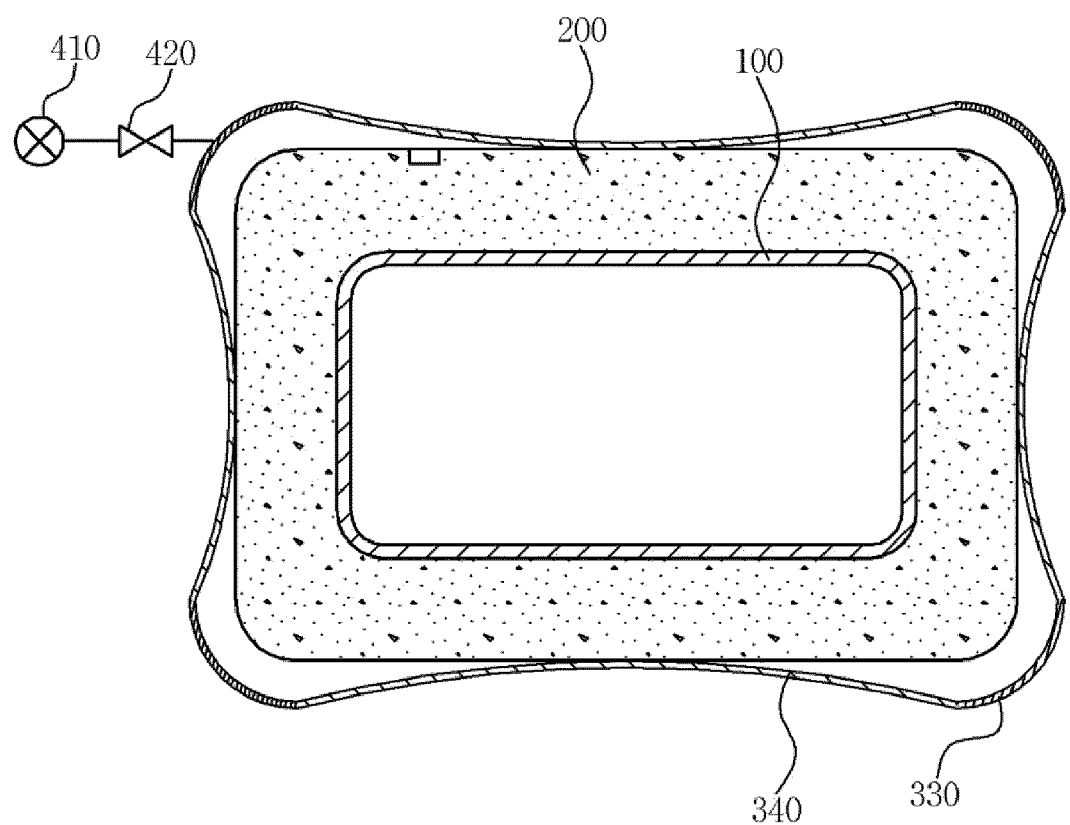
FIGS. 17 to 21 are cross-sectional views illustrating a vacuum heat-insulation device according to a fourth embodiment of the present disclosure.

FIG. 17 is a cross-sectional view illustrating a modified example of the vacuum heat-insulation device 1000 according to the fourth embodiment of the present disclosure. Referring to FIG. 17, the low-temperature tank 100 of the vacuum heat-insulation device 1000 is made of a polyhedron having a plurality of planes and corners connecting the plurality of planes, in which the flexible portion 340 is formed to surround the outer surface of the low-temperature heat-insulation layer 200 forming the plane of the vacuum jacket 300, and the robust portion 330 is formed to surround the outer surface of the low-temperature heat-insulation layer 200 forming the corner of the vacuum jacket 300, such that it is preferable to form a structure that the flexible portion 340 is compressed to the inside or expanded to the outside according to the deformation of the internal space of the vacuum jacket 300, and the low-temperature heat-insulation layer 200 surrounding the outer shell 110 of the low-temperature tank 100 is supported. In this case, the robust portion 330 may be fixed to an external structure, and it is preferable to utilize the space formed inside the robust portion 330 as the internal discharge space 210 connected to the vacuum pump 410.

Figure 18:
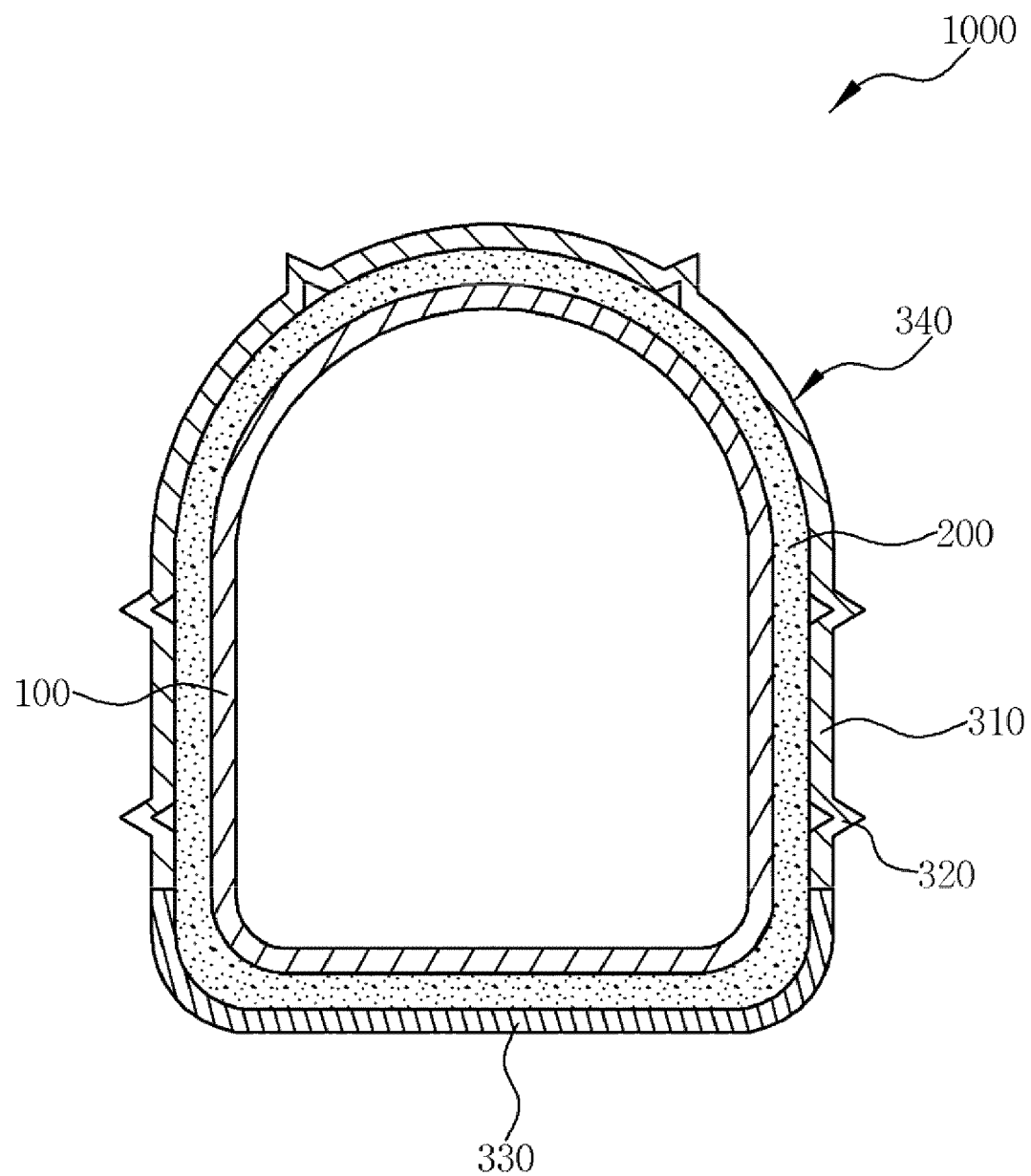
Figures 19A, 19B:
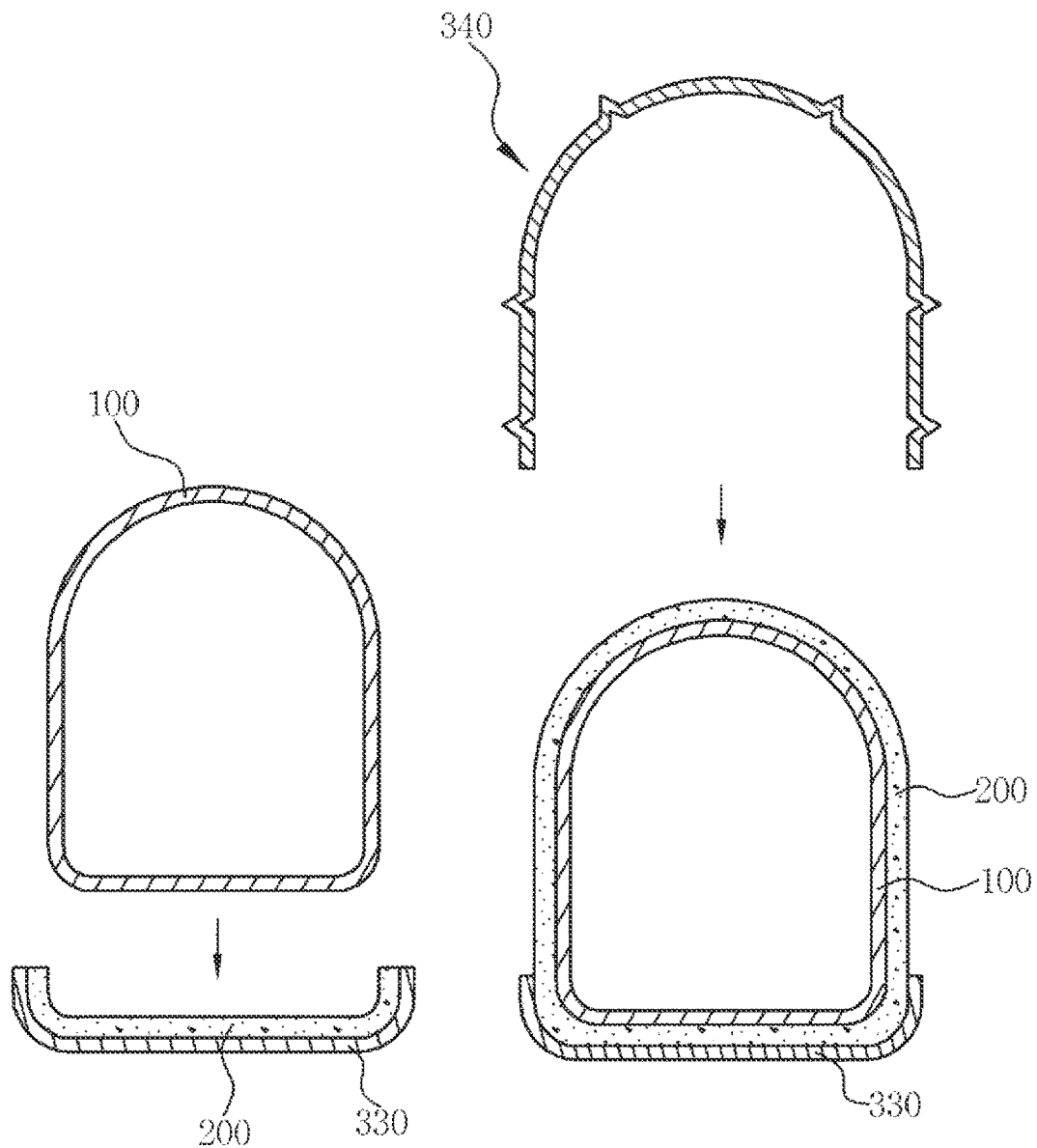

FIG. 18 is a cross-section view illustrating a modified example of another aspect of the vacuum heat-insulation device 1000 according to the fourth embodiment of the present disclosure and FIGS. 19A-B is an exemplary view illustrating a procedure for installing the vacuum heat-insulation device 1000 according to FIG. 18. Referring FIGS. 18 and 19A-B, the vacuum heat-insulation device 1000 may be configured so that the robust portion 330 is formed to surround the outer surface of the low-temperature heat-insulation layer 200 constituting a lower portion of the vacuum jacket 300, and supports a bottom surface of the vacuum heat-insulation device 1000. In this case, the flexible portion 340 of the vacuum jacket 300 may be formed as the deformable joint portion 320 that contracts or expands according to the deformation of the internal space of the vacuum jacket 300, thereby performing the expansion and contraction in an upward direction except for the lower portion of the vacuum heat-insulation device 1000.

In this case, the low-temperature tank 100 of the vacuum heat-insulation device 1000 is constituted as a large tank with a volume of 1000 $M^3$ or more, and when the low-temperature tank 100 is manufactured in a cylindrical shape that is strong against internal pressure, the low-temperature tank 100 may be manufactured as a large tank with a volume of 10000 $M^3$ or more. In the case of the large tank as described above, as illustrated in 19A-B, the R-PUF forming the low-temperature heat-insulation layer 200 is sprayed or bonded to the inside of the robust portion 330 seated on the ground, and a pre-manufactured low-temperature tank 100 is seated on an upper portion of the bonded low-temperature heat-insulation layer 200 and fixed thereto (FIG. 19A). Thereafter, the low-temperature heat-insulation layer 200 is formed along an outer surface of the fixed low-temperature tank 100, and thereafter, an upper portion of the vacuum jacket 300 is coupled to the lower portion of the vacuum jacket 300, and the upper and lower portions of the vacuum jacket 300 are welded, thereby manufacturing the vacuum heat-insulation device 1000. The vacuum heat-insulation device 1000 of the present disclosure having the manufacturing steps as described above enables a super-large tank that may not be transported to be manufactured, and performs vacuum heat-insulation in the field.

Figure 20:
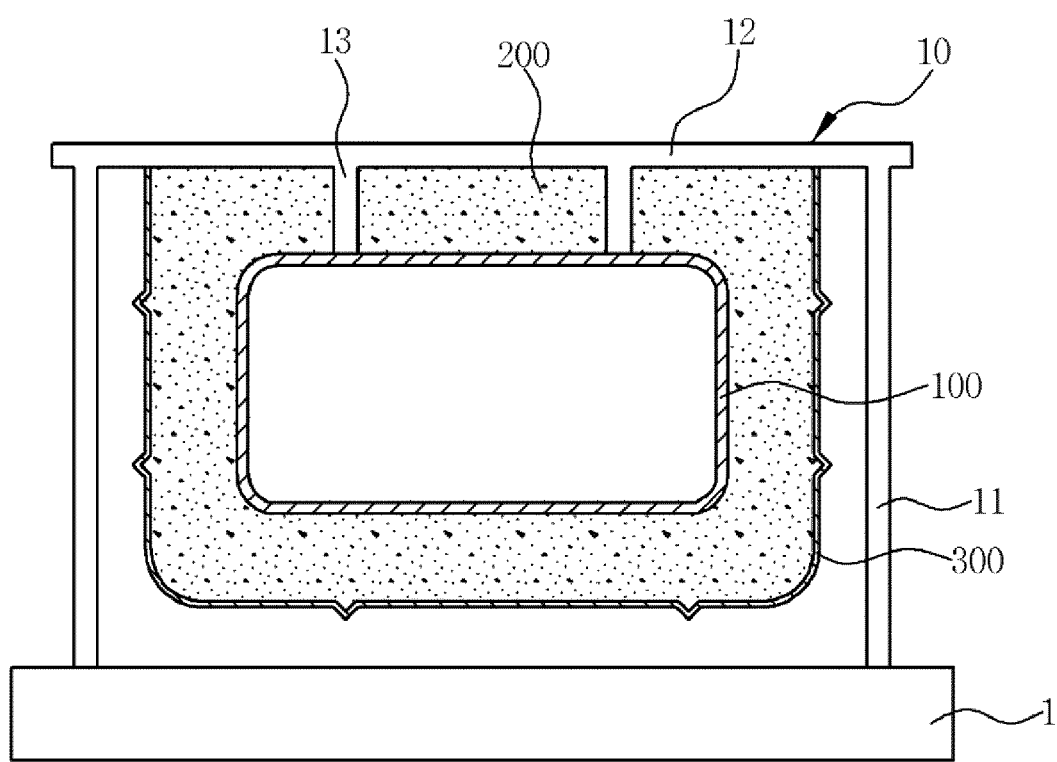
Figure 21:
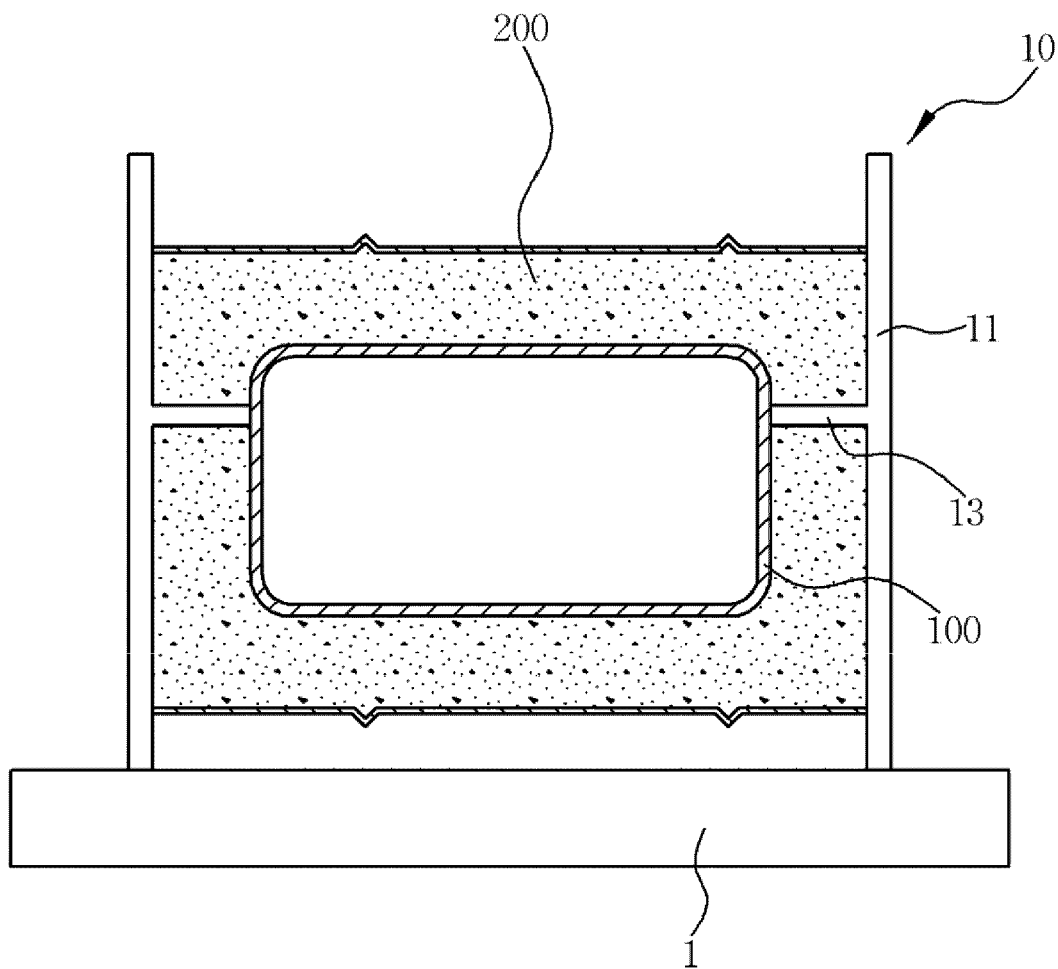

The vacuum heat-insulation device 1000 for a low-temperature tank of the present disclosure according to the above-described configuration is more suitable for transport and storage of ultra-low-temperature liquefied gases such as liquid hydrogen ($LH_2$) or liquid nitrogen ($LN_2$), and in the case of the low-temperature tank storing the liquid hydrogen ($LH_2$), a density of the liquid hydrogen is 0.08988 g/L and does not significantly affect the weight of the low-temperature tank 100. Therefore, FIGS. 20 and 21 illustrate a vacuum heat-insulation device further including a tank support body 10 formed to support the low-temperature tank 100 in a floating state, and separate a lower end of the vacuum jacket 300 from the ground 1 by a predetermined distance. Referring to FIG. 20, the tank support body 20 may include a tank hanger 13 connected to the upper surface of the low-temperature tank 100, an upper support body 12 that supports the tank hanger 13 and forms a portion of the vacuum jacket 300, and a side support body 11 that extends upwardly such that the lower end of the vacuum jacket 300 is spaced apart from the ground 1 to support the upper support body 12. In this case, the vacuum jacket 300 is coupled to a lower surface of the upper support body 12 of the tank support body 10 to form an integral body, so that the upper support body 12 serves as the robust portion of the vacuum jacket 300 described above.

In addition, as illustrated in FIG. 21, the tank support body 10 of another aspect of the present disclosure may include a tank hanger 13 connected to the side surface of the low-temperature tank 100, and a side support body 11 that forms a portion of the vacuum jacket 300 and extends upwardly so that the lower end of the vacuum jacket is spaced apart from the ground 1 to support the tank hanger. In this case, the side support body 11 may be bonded to the side surface of the vacuum jacket 300 to serve as the robust portion described above.

In this case, by separating the vacuum heat-insulation device 1000 from the ground 1 through the tank support body 10 according to the above-described configuration, it is possible to block the heat flowing from the ground 1 to the lower ends of the low-temperature tank 100 and the vacuum jacket 300, and the deformable joint portion 320 of the vacuum jacket 300 bent outwardly may be provided at the lower end of the low-temperature tank 100.

The present disclosure is not limited to the above-mentioned embodiments, and may be variously applied, and may be variously modified without departing from the gist of the present disclosure claimed in the claims.

INDUSTRIAL APPLICABILITY

The present disclosure relates to a vacuum heat-insulation device for a low-temperature tank for storing and transporting liquefied gas in an ultra-low-temperature state, and has the effect that may manufacture a large tank capable of storing and transporting liquefied gas in an ultra-low-temperature state. That is, the present disclosure is applicable to an industry of manufacturing a ship or a ground-type tank on which a low-temperature tank that stores and transports liquefied gas in the ultra-low-temperature state is mounted.

DESCRIPTION OF REFERENCE NUMERALS

1000: vacuum heat-insulation device
100: low-temperature tank   110: outer shell of tank
200: low-temperature heat-insulation layer   210: internal discharge space
220: fixing bolt
300: vacuum jacket   310: smooth portion
311: outer side end   311A: recess groove -continued 320: deformable joint portion  321: polymer elastic body
322: concave-convex portion
330: robust portion  340: flexible portion
410: vacuum pump  420: exhaust valve
430: exhaust pipe
440: discharge pipe  441: suction hole
500: high-temperature heat-insulation material  600: spacer
A: bonding surface  B: welding line
1: ground
10: tank support body  11: side support body
12: upper support body  13: tank hanger

The invention claimed is:

1. A vacuum heat-insulation device for a low-temperature tank, the vacuum heat-insulation device comprising:
a low-temperature tank having a storage space for accommodating an ultra-low-temperature fluid therein;
a low-temperature heat-insulation layer provided to surround an outer shell of the low-temperature tank; and
a vacuum jacket having an internal space maintained in a vacuum state and sealed to surround an outer surface of the low-temperature heat-insulation layer to maintain airtightness with the outside,
wherein the vacuum jacket has a flexible structure in which at least a portion thereof is contracted or expanded, and
wherein the vacuum jacket includes:
a plurality of smooth portions surrounding the outer surface of the low-temperature heat-insulation layer and made of flat plates spaced apart from each other by a predetermined distance, and
a deformable joint portion formed between the plurality of smooth portions and having the flexible structure.

2. The vacuum heat-insulation device of claim 1, wherein the deformable joint portion connects the plurality of smooth portions, and is formed of a polymer elastic body that is stretchable in response to a deformation of the internal space of the vacuum jacket.

3. The vacuum heat-insulation device of claim 2, wherein the polymer elastic body is interposed between the plurality of smooth portions and is bonded to outer side ends of the plurality of smooth portions in a width direction thereof.

4. The vacuum heat-insulation device of claim 2, wherein the plurality of smooth portions are provided to overlap with at least one adjacent smooth portion in a thickness direction, and respond to a contraction or an expansion of the internal space while being slid when the internal space is deformed, and
the polymer elastic body is provided on upper surfaces of portions overlapped with the plurality of smooth portions to maintain the airtightness of the vacuum jacket and is contracted or expanded in response to the deformation of the smooth portions.

5. The vacuum heat-insulation device of claim 1, wherein the low-temperature heat-insulation layer is provided in plural, and
a plurality of low-temperature heat-insulation layers are provided to be spaced apart from each other to form an internal discharge space forming a flow path for forming a vacuum between the plurality of low-temperature heat-insulation layers that are adjacent to each other.

6. The vacuum heat-insulation device of claim 5, wherein the plurality of low-temperature heat-insulation layers are provided to form a multiple layer in the thickness direction, and are fixed to at least one of the outer shell of the low-temperature tank, the vacuum jacket, or the adjacent low-temperature heat-insulation layer using a fixing bolt to be spaced apart from each other by a predetermined distance.

7. The vacuum heat-insulation device of claim 6, further comprising a discharge pipe provided in the internal discharge space and having a suction hole that is formed on an outer circumferential surface and communicates with the internal space of the vacuum jacket.

8. The vacuum heat-insulation device of claim 1, wherein the deformable joint portion is integrally formed with the plurality of smooth portions, and forms a concave-convex portion curved outwardly in the thickness direction, and
the concave-convex portion is deformed according to the contraction or expansion of the internal space of the vacuum jacket.

9. The vacuum heat-insulation device of claim 8, wherein the deformable joint portion is configured to form an internal discharge space forming a flow path for forming a vacuum inside the concave-convex portion curved outwardly in the thickness direction.

10. The vacuum heat-insulation device of claim 8, wherein the vacuum jacket is integrally formed by welding the plurality of smooth portions, and a welding line formed on the outer surface of the vacuum jacket is provided in the internal space of the vacuum jacket and is formed at a position coincident with the internal discharge space.

11. The vacuum heat-insulation device of claim 8, wherein the vacuum jacket is integrally formed by welding the plurality of smooth portions, and
the vacuum heat-insulation device further includes a high-temperature heat-insulation material provided inside the welding line formed on the outer surface of the vacuum jacket to prevent thermal deformation of the low-temperature heat-insulation layer near the welding line.

12. The vacuum heat-insulation device of claim 1, wherein the vacuum jacket includes a first vacuum jacket surrounding the outer surface of the low-temperature heat-insulation layer and a second vacuum jacket provided to surround an outer surface of the first vacuum jacket, and
the vacuum heat-insulation device further includes a spacer interposed between the first vacuum jacket and the second vacuum jacket to separate the first vacuum jacket and the second vacuum jacket from each other by a predetermined distance.

13. The vacuum heat-insulation device of claim 1, wherein the vacuum jacket includes a flexible portion and a robust portion, where the flexible portion surrounds the outer surface of the low-temperature heat-insulation layer and has a flexible structure, while the robust portion provides a robust structure supporting the vacuum heat-insulation device.

14. The vacuum heat-insulation device of claim 13, wherein the low-temperature tank is made of a polyhedron,
the flexible portion is formed to surround the outer surface of the low-temperature heat-insulation layer forming a plane of the vacuum jacket, and
the robust portion is formed to surround the outer surface of the low-temperature heat-insulation layer forming a corner of the vacuum jacket.

15. The vacuum heat-insulation device claim 13, wherein the vacuum jacket is configured to form an internal discharge space forming a flow path for forming a vacuum inside the robust portion.

16. The vacuum heat-insulation device of claim 13, wherein the robust portion is formed to surround the outer surface of the low-temperature heat-insulation layer constituting a lower portion of the vacuum jacket, and supports a bottom surface of the vacuum heat-insulation device.

17. The vacuum heat-insulation device of claim 13, further comprising a tank support body formed to support the low-temperature tank in a floating state, and separate a lower end of the vacuum jacket from a ground by a predetermined distance.

18. The vacuum heat-insulation device of claim 17, wherein the tank support body includes:
- a tank hanger connected to the upper surface of the low-temperature tank,
- an upper support body that supports the tank hanger and forms a portion of the vacuum jacket, and
- a side support body that extends upwardly such that the lower end of the vacuum jacket is spaced apart from the ground to support the upper support body.

19. The vacuum heat-insulation device of claim 17, wherein the tank support body includes:
- a tank hanger connected to a side surface of the low-temperature tank, and
- a side support body that forms a portion of the vacuum jacket and extends upwardly so that the lower end of the vacuum jacket is spaced apart from the ground to support the tank hanger.

* * * * *